(12) United States Patent
Pan

(10) Patent No.: US 8,646,961 B2
(45) Date of Patent: Feb. 11, 2014

(54) REFLECTIVE PLATE, PLANAR LAMP AND PLANAR LAMP FIXTURE INCLUDING THE SAME

(76) Inventor: Dingguo Pan, Shanghai (CN)

( * ) Notice: Subject to any disclaimer, the term of this patent is extended or adjusted under 35 U.S.C. 154(b) by 231 days.

(21) Appl. No.: 13/060,871

(22) PCT Filed: Aug. 26, 2008

(86) PCT No.: PCT/CN2008/001535
§ 371 (c)(1),
(2), (4) Date: May 10, 2011

(87) PCT Pub. No.: WO2010/022540
PCT Pub. Date: Mar. 4, 2010

(65) Prior Publication Data
US 2011/0211367 A1    Sep. 1, 2011

(51) Int. Cl.
*F21V 7/04* (2006.01)
(52) U.S. Cl.
USPC ............ 362/612; 362/601; 362/602; 362/603
(58) Field of Classification Search
USPC .................................. 362/600–612
See application file for complete search history.

(56) References Cited

U.S. PATENT DOCUMENTS

| | | |
|---|---|---|
| 2002/0080596 A1 | 6/2002 | Fukiharu |
| 2005/0073828 A1 | 4/2005 | Ha |
| 2006/0104089 A1 | 5/2006 | Feng et al. |
| 2008/0186739 A1 | 8/2008 | Chen et al. |

FOREIGN PATENT DOCUMENTS

| | | |
|---|---|---|
| CN | 1328629 | 12/2001 |
| CN | 1591058 | 3/2005 |
| CN | 1700065 | 11/2005 |
| CN | 1924621 | 3/2007 |
| CN | 201037884 | 3/2008 |
| EP | 0 766 037 | 2/2003 |
| JP | 2004-109391 | 4/2004 |
| WO | 2009/003313 | 1/2009 |
| WO | 2009/100560 | 8/2009 |

OTHER PUBLICATIONS

International Search Report for international patent application No. PCT/CN2008/001535, dated Jun. 4, 2009 (10 pages).

*Primary Examiner* — Mary Ellen Bowman
(74) *Attorney, Agent, or Firm* — Hamre, Schumann, Mueller & Larson, P.C.

(57) ABSTRACT

A directional prism reflective plate includes a prism surface (11) and a smoothing plane (12). A plurality of prism bodies (111) are arranged on the prism surface (11). The prism bodies (111) are continuously arranged in continuous zigzag form, and symmetrically or asymmetrically arranged relative to the center plane. Respective cross-section triangles of the prism bodies (111) have same shape and area, the distances from the vertexes of the cross-section triangle to the smoothing plane (12) are gradually reduced, so as to reflect the sunlight entirely. It is also provide a planar lamp and a planar lamp fixture including the reflective plate.

18 Claims, 11 Drawing Sheets

REFLECTIVE PLATE, PLANAR LAMP AND PLANAR LAMP FIXTURE INCLUDING THE SAME

TECHNICAL FIELD

This invention relates to a light-reflecting plate with micro prisms, particularly to a light-reflecting plate with triangular prisms having equal section and the sheet lamps and lighting fixtures made therefrom.

BACKGROUND ART

In prior art, the light-reflecting sheet or plate is mainly used for reflection and refraction of light rays. Later strip-type micro prisms are added for better reflection and refraction of the sun light and further, lighting fixtures are added at both ends to function as both luminous panel and lighting. In Chinese patent No. 200510029375.1, the applicant invented a micro prism-type sunlight reflecting plate and its regulating device, wherein the surface of the light-reflecting plate is equipped with several parallel micro prism bodies having the shape of isosceles right triangles, the vertex angle of which is 90° and the base angle is 45°. On each end face, there is blind hole to receive the LED lamp bodies. This kind of light-reflecting plate is used for rooms with glass ceiling, windows or skylights, which gives sufficient access to sunlight in winter and completely or partially reflects back the sunlight in summer. It shades from direct sunlight while ensuring adequate lamination indoors. The lamp bodies on both ends can provide additional lighting at dark weather or at night. Although the light-reflecting plate of this structure can make the overall plate to function as a luminous surface under the action of the lamp bodies, its luminance is very low due to limitation by design structure.

Inspired after the aforesaid patent, the applicant envisages how to employ the combination of light-reflecting plate and LED with lighting fixtures and starts to study on changing the point light source of the light-reflecting plate to surface light source via LED. That is to use LED for lighting other than for decoration. For this purpose, the applicant has disclosed two light-reflecting plates in PCT/CN2007/002052 and PCT/CN2008/000031. Among them, one is flat light-reflecting plate, wherein one surface is arranged with several parallel strip-type micro prism bodies, the cross sections of the left and right scalene right-angle triangles adjacent to the symmetrical central plane are the largest and the cross sections towards the left and right sides are successively decreasing. The other is a circular light-reflecting plate consisting of right-angle triangular micro prisms with the central axis as the symmetrical center, wherein several annular micro prism bodies are formed in its radial direction with its cross section and section area being the same with those of the flat one. After blind holes and lamp bodies are equipped on both ends and circumferential faces of the two light-reflecting plates, for example, circular light-reflecting plate has lamp bodies which are arranged thereon, and the emission centers of these lamp bodies are parallel to the plane of the light-reflecting plate, or pass through the apexes of the inclusion angles of the annular prism bodies on the plane of the light-reflecting plate. The light emitted from the lamp bodies will reflect from the micro prism bodies, resulting in good lighting effect.

In further studies, it has been found that the flat and circular light-reflecting plates with the above-mentioned structures show the shortcomings that the reflecting and emitting light rays on one plane from the light-reflecting plate via the prisms are non-uniform (influencing the lighting effect) and small scale of light sheets made of light-reflecting plate, that is, asymmetrical one-side micro prism layout. The above both patent applications have not addressed these problems.

SUMMARY OF THE INVENTION

The objective of the present invention is to provide a possibility for an oriented symmetric light-reflecting plate with triangular prism having the same section to reflect and emit evenly distributed (equivalent) light rays on one plane via the prism.

The other object of the invention is to use low power and low current LED chips, instead of high-power LED so as to prevent complicated lighting fixtures due to complicate LED heat-dissipating structure, and avoid decreasing of luminous flux due to high LED temperature resulting from high power so that each beam of light can accurately orient its emission, transmission and reflection, thereby achieving better lighting effect.

Another object of the invention is that the micro prism of the light-reflecting plate is arranged unilaterally and the plate lighting fixture made therefrom is equipped with nonsymmetrical unilateral sheet lamp having micro prisms.

Another objective of the present invention is to make lighting fixtures by using the sheet lamp made from the aforesaid prism light-reflecting plate and single-side micro prism sheet lamp.

To achieve the objectives as mentioned above, this invention adopts a light-reflecting plate with triangular microprisms having identical cross section, wherein a plurality of parallel strip-like micro prism bodies are arranged along the left and right sides starting from the plane of the symmetrical center on the prism surface of the light-reflecting plate, the cross section of each micro prism body is triangle and the micro prism bodies are continuously arranged in zigzag form, wherein the triangles have the same shape and the same cross sectional area; the left and right apexes of the triangle adjacent to the symmetric center plane have the shortest distance away from another surface (it is also called the smooth surface) of the light-reflecting plate, and the apices of the triangles towards the periphery of the light-reflecting plate have the successively increasing distances away from the smooth surface of the light-reflecting plate; the connection lines among the apices of the triangles of the prism bodies are two inclined straight lines, intersecting at a point with the central axial line of the light-reflecting plate and forming an inclusion angle α with the smooth surface of the plate wherein the inclusion angle α is less than 45' and the distance of all triangles is equal in the length direction.

In one embodiment of the above light-reflecting plate, the inclusion angle is less than 10° and the triangle is right-angle or non-right-angle triangle.

The sheet lamp made of the aforesaid light-reflecting plate comprises a light-reflecting plate, a side frame, a reflecting back plate and a plurality of lamp bodies, wherein the side frame is a rectangular frame comprising the left and right heat-dissipating strips connected with the upper and lower end enclosures, the heat-dissipating strips are respectively equipped lengthwise with a collar projecting out of the lower part of the internal side face and a boss projecting out of the upper part of the internal side face and equipped with horizontal groove, the light-reflecting plate is installed on the side frame with its two sides arranged on the collar so that the top end of the flange on the lower part is butt connected with the internal side faces of the two heat-dissipating strips and a gap forms between the side plane where the flange is located and the internal side faces of the two heat-dissipating strips, thereby forming a sunken groove parallel to and also symmetric to the center plane; the section of the end enclosure is of shape, the reflecting back plate is made of plastic, paper or metal materials, which is equipped on the light-reflecting plate by inserting in the horizontal groove of the boss of the heat-dissipating strip via the edge; the lamp body is LED, light bulb, electrode tubes or prefabricated LED assemblies and the lamp bodies are mounted in respective lamp grooves; the LED emitting plane intersects with the connection lines of the apices of the sectional triangles on the prism surface and form an inclusion angle of 90-α.

In one embodiment of the above sheet lamp, the apices of the continuously zigzag-formed triangles have successively decreasing distance from the smooth surface and the extension line of the marginal side, which is either of the right side and the left side of the triangles, intersects with the smooth surface relative to the prism surface and forms an inclusion angle with the normal line thereof, ranging from 40° to 90°.

In one embodiment of the above sheet lamp, the lamp body is prefabricated strip-like lamp assembly comprising a plurality of LED bonding dies and circuit board, wherein the lamp assembly is directly installed, or inserted or embedded in the groove so as to enable the LED emitting plane inside the groove to be closely attached with the internal wall of the groove and form a 90-α inclusion angle with the plane of the connection line of the apices of the sectional triangles of the light-reflecting plate.

In one embodiment of the above sheet lamp, the side of the sectional triangle where the triangular prism body radiates towards the LED or the side adjacent to the light is the light-receiving marginal side and also the light-receiving marginal face of the triangular prism body, wherein the extension line of the marginal side intersects with the smooth surface relative to the prism surface and forms an inclusion angle with the normal line thereof, ranging from 40°-90°.

In one embodiment of the above sheet lamp, the main axis of the LED light ray is a light beam parallel to the smooth surface of the light-reflecting plate; when there are n triangular prism bodies on one side of the center plane of the light-reflecting plate and the area of the luminous plane for each LED is A, then the area A is equally divided into n parts corresponding to the numbers of the prism bodies; if the total photon energy provided is E, then photon energy distributed to each equal area is E/A/n so that the light ray emitted by the LED can be evenly radiated on the light-receiving marginal side of any sectional triangle of the center plane or the light-receiving marginal face of the triangular prism body.

In one embodiment of the above sheet lamp, the LED and LED bonding die are low-power tubes and a plurality of chips can be installed in one LED bonding die.

In one embodiment of the above sheet lamp, the heat-dissipating strip is equipped with an internal groove along the length direction corresponding to the back of the boss behind the circuit board to prevent contact of the electricity-conducting parts on the circuit board.

In one embodiment of the above sheet lamp, the heat-dissipating strip is equipped with horizontal heat-dissipating rib at place corresponding to the back of the collar.

The sheet lighting fixture made from the sheet lamp of the present invention further comprises a bottom frame and an LED constant current source, wherein the bottom frame is a rectangular frame made of metal materials, on the left and right framing strips of which are crossed with several metal strips and along the length direction of the lower surface of the left and right framing strips are two short rectangular raised parts projecting downward relative to the internal side and two long rectangular raised parts projecting downward located outside; long grooves are equipped on the surface of the left and right heat-dissipating strips of the side frame along its length direction to match with the long raised parts; the bottom frame is installed on the side frame, the long raised parts of the side frame can be inserted into the long grooves of the side frame and the end of its short raised part contacts closely with the upper surface of the boss of the side frame and forms a long rectangular space between lower surface of the interval part of the short and long raised parts and the surface of the side frame corresponding to it; the LED constant current source is installed on the metal strips of the bottom frame via the connecting pieces, and the output terminal thereof is connected with the connecting terminal via the lead wire.

In one embodiment of the above sheet lighting fixture, along the length direction of the interval of the short and long raised parts are equipped with several bolt holes. The heat-dissipating strips of the bottom and side frames are relatively fastened by fixing the external wall of the long groove with the long raised part of the bottom frame of the long groove, in which the heat-dissipating strips are inserted, using center pins via the conical holes and bolt holes equipped along the length direction.

This invention relates to a non-symmetrical light-reflecting plate with triangular micro-prisms having identical cross section, wherein a plurality of parallel strip-like micro prism bodies are arranged from one side to another side on one of the prism surface of the light-reflecting plate, the cross section of each micro prism body is triangle and the micro prism bodies are continuously arranged in zigzag form, characterized in that the triangles have the same shape and the same cross sectional area, and the apices of the triangles from left to right or from right to left of the light-reflecting plate have the successively increasing or decreasing distances away from the smooth surface of the light-reflecting plate; the connection lines of the apices is a straight line, intersecting with the line where the section of the smooth surface of the light-reflecting plate is located and forming an inclusion angle α, which is less than 45° and the distance of all triangles is equal in the length direction.

In one embodiment of the above light-reflecting plate, the inclusion angle α is less than 10° and the triangle is right-angle or non-right-angle triangle.

The sheet lamp made from nonsymmetrical light-reflecting plate comprises a light-reflecting plate, a heat-dissipating strip, and a plurality of lamp bodies, wherein the flange at the edge of the micro prism body whose apex of the triangle is farthest to the smooth surface among the micro prism bodies of the light-reflecting plate is equipped with a long groove at the side of the prism surface and parallel to the prism body; the heat dissipating strip is made of heat-conducting metal materials, the section thereof can be rectangular or angular shape and it is installed at the upper part of the long groove; the surface of the side exposing outside the long groove is the heat-dissipating side equipped with parallel heat-dissipating ribs. A lamp groove is formed between its lower surface and the corresponding wall of the long groove. The lamp body is LED, light bulb, electrode tube or prefabricated LED lamp assembly, which are installed in the lamp grooves, respectively.

In one embodiment of the above sheet lamp, it comprises a connecting terminal. The light-reflecting plate is equipped with a jack respectively on the end face of the edge part outside the groove and the connecting terminals are installed respectively in the jacks and connected with the lead wire of the strip-like lamp assembly.

The sheet lighting fixture made from nonsymmetrical light-reflecting plate further comprises a sheet lamp made therefrom, retaining pieces and a bottom frame, wherein the bottom frame comprises the retaining frame of sheet lamp and bottom plate; the retaining frame of the sheet lamp is equipped with enclosure wall available for clamping the sheet lamp on the front surface and a plurality of installation holes on the rear surface. The retaining pieces are a plurality of magnetic pieces and are installed in the installation holes respectively. The bottom frame is a flat plate that can be installed on any outdoor and indoor plate walls via the connecting pieces and is equipped with metal blocks to be engaged with the magnetic pieces at places corresponding to the magnetic pieces.

In one embodiment of the above sheet lighting fixture, one face of the reflecting back plate is the polished reflecting back plate and the other face is equipped with a plurality of heat-dissipating ribs.

Therefore, the light-reflecting plate with triangular micro prism having equal section is equipped with micro prism edges on the prism surface, wherein the micro prism edges are arranged in zigzag form and symmetrically with the center plane or arranged bilaterally from left to right (non-symmetrical). The apices of the sectional triangles have successively increasing distance away from the smooth surface of the light-reflecting plate so that the direct sunlight can be completely reflected without influence to the indoor access of the scattered sunlight, thus ensuring sun-proof and bright indoor environment. The shape of the sectional triangles for the light-reflecting sheets is optional to ensure the prism edges have optimum optical beam deflection to the sunlight, by which the sunlight can be partially or wholly reflected towards the two sides of the light-reflecting sheets where the solar energy is thus saved by the solar cells. In addition, LED is installed in the lamp groove of the light-reflecting sheet to form a sheet lamp. The light-reflecting sheet is made of transparent plastics and LED is surface mounted, the surface of LED is closely attached with wall of the lamp groove to ensure transmission of light rays via single medium, just like light transmitted through glass fiber, thus ensuring minimum energy loss in the transmission of LED light rays. The transmission efficiency of light under completely internal reflection can reach 90-99%. The sheet lamp of the present invention is different from the traditional spot light because it can provide ideal light rays with certain projection angle without adjustment of the main axis of the emitting lighting fixtures.

Moreover, sheet lamp can be used to make sheet lighting fixture, which is thin-wall type, and thus the sheet lighting fixture can be embedded into the wall via the retaining pieces and bottom frame to keep the same plane with the wall. The oriented light ray emitted by the sheet lighting fixture forms a fixed angle expected by the users in the horizontal direction and meanwhile, the oriented light ray can be accurately positioned to radiate the places expected by the users in whatever directions, upwards or downwards, left or right. On the one hand, the thin-wall oriented sheet lighting fixture can be widely used for kitchen walls, internal wall of cupboard, and places over WC mirrors, staircases and passages, corridor, wall ads lighting, factory streamline and others. On the other hand, the sheet lamp for such lighting fixture consumes little power, just 1/10 or lower than that by the common light bulbs but having the same illuminating brightness with the common light bulbs and also featuring limited heat release and long service life. This will expand the space of and facilitate the life, work and learning of our people, while ensure high efficiency, energy conservation, and safety use, in addition to simple structure and use.

BRIEF DESCRIPTION OF THE DRAWINGS

FIG. 2b is the partial enlargement view of I in FIG. 2a.

FIG. 2c is the bottom view of FIG. 2a.

DETAILED DESCRIPTION OF THE INVENTION

First Embodiment

Figure 1:
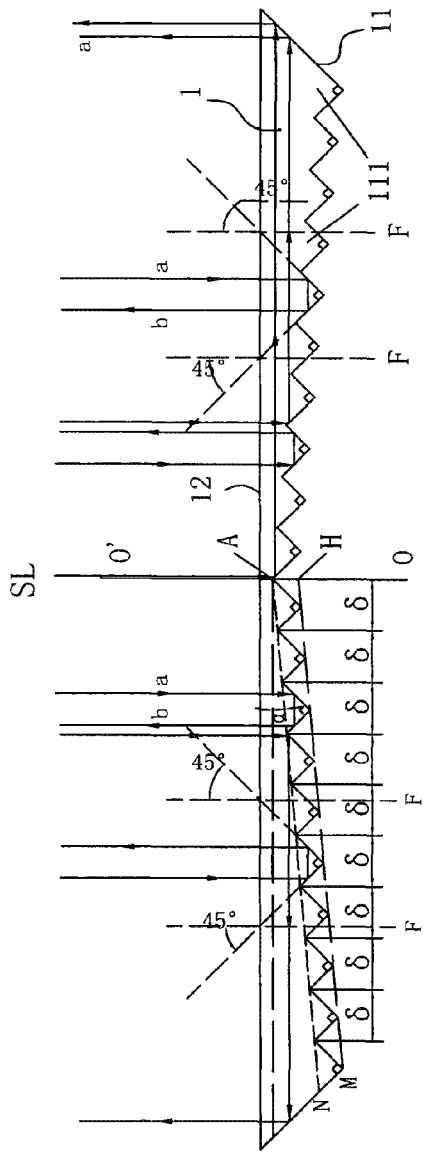
FIG. 1 is the sectional view of the cross section of the light-reflecting sheet with triangular prism having equal section, indicating that the triangular prism bodies on both sides of the center plane of the light-reflecting sheet are arranged symmetrically in zigzag form.

Refer to FIG. 1. According to the first embodiment of this invention, the light-reflecting sheet with triangular micro prisms having equal section in the invention is equipped with a plurality of parallel strip-like micro prism bodies 111 arranged along the left and right sides starting from the plane of the symmetrical center OO' on the prism surface 11 of the light-reflecting sheet 1, the cross sections of each micro prism body 111 are triangles, including both right and non-right-angle triangles, wherein the triangles are continuously arranged in zigzag form with equal section and the left and right apexes of the triangle adjacent to the symmetric center plane has the shortest vertical distance away from another surface, called the smooth surface 12, of the light-reflecting plate, and the apices of the triangles towards the left and right sides of the light-reflecting plate have the successively increasing vertical distances away from another surface of the light-reflecting plate (the central plane or central axis is symmetrical along its side and therefore the vertical distance of the left side is taken as an example). The apices of all triangles have equal distance in horizontal direction, respectively 6. Thus the overall width of the triangular prism body is δ×2n, wherein, n is the number of triangular prism bodies on one side of the symmetrical central plane. In addition to the smooth surface 12 and the zigzag-formed prism surface 11 for the light-reflecting sheet in the invention, the apices of the triangles adjacent to the smooth surface 12 can be connected and those far from the smooth surface 11 can also be connected (with the left side of the central plane as an example) to obtain two planes connected by two straight lines, which (two planes) are inclined but parallel to each other and intersect with the sectional central axis of the light-reflecting sheet at points A and H. The two lines AN and HM form an inclusion angle α with the smooth surface 12 of the light-reflecting sheet, wherein a is less than 10°.

On the other hand, the light-reflecting plate of this invention is made of transparent plastics and therefore, it is similar to common optical glass in conducting light rays. In FIG. 1, on the prism surface 11 of the light-reflecting plate 1 are equipped with strip-like micro prism bodies 111 with non-isosceles triangles having equal section and vertex angle of 90°. Each prism body 111 reflects light rays by way of prism reflection. Sunlight directly radiates on the light-reflecting plate 1 parallel to the normal face F of the prism, wherein each incident ray a enters into the two vertical faces of the micro prism body 111 via the upper part of the upper smooth surface 12 of the light-reflecting plate 1 so that it is reflected in the direction b parallel to the incident ray a, i.e. parallel to the inclination face for outgoing and ingoing sunlight of the prism body on the inclination face of the micro prism body 111, and the sunlight is reflected on each right-angle side so that the light ray is deflected at 180° so as to reflect the parallel ingoing light rays.

In case the cross section of each micro prism body is not isosceles right-angle triangles, when the sunlight parallel to the inclination face of the reflecting prism enters and emits out the inclination face of the prism, the reflection on each right-angle face is deflected by 180°, which can also reflect the parallel incident rays.

In addition, for the purpose of design, we have introduced the concept of marginal edge in this application. That is, either of the right and left sides of each triangle towards the direction where the distance from the apex of the zigzag-arranged triangles to the smooth surface is gradually decreasing is called marginal edge, the extension line of which intersects with the smooth surface relative to the prism surface and forms an inclusion angle ranging from 40° to 90° with the normal line.

In the invention, when the sheet lamps are made from the aforesaid light-reflecting plates with different triangles having identical cross section and lamp bodies, we will explain how the sheet lamps made therefrom reflect and refract under LED irradiation in a way different from sunlight as follows.

Figure 2A:
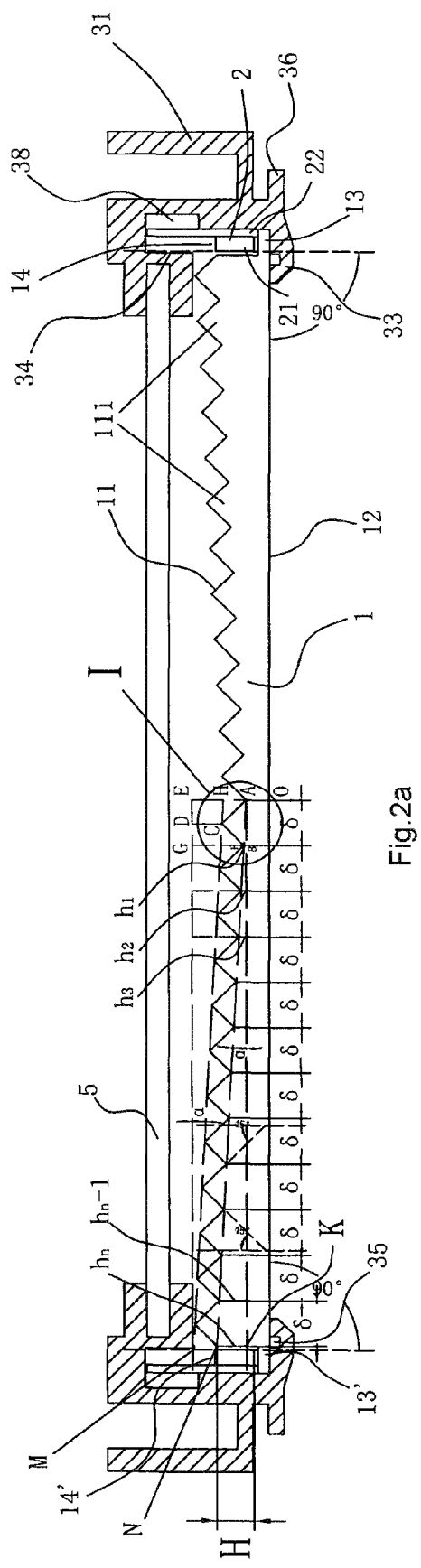
FIG. 2a is the sectional view of the cross section of the sheet lamp made of the light-reflecting sheet with triangular prism having equal section of FIG. 1.
Figure 2B:
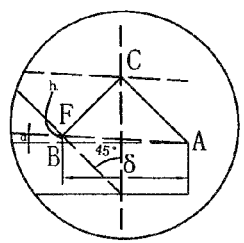
Figure 2C:
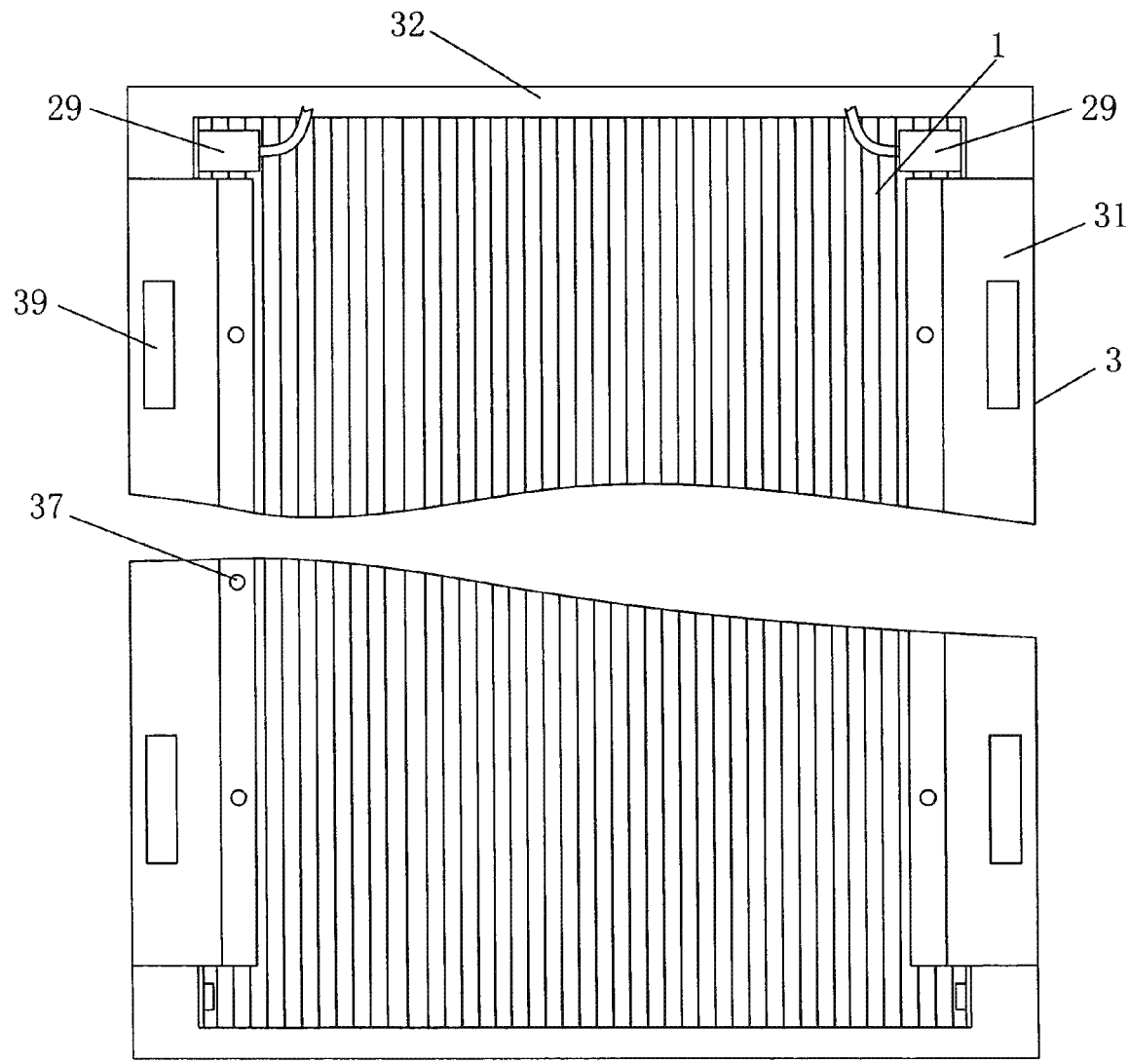

Refer to FIG. 2. According to the sheet lamp of this invention, it comprises a light-reflecting sheet 1, a plurality of lamp bodies 2, a side frame 3 and a reflecting back plate 5, wherein the light-reflecting sheet 1 is left with an edge extending outward at or outside the two right-angle triangular prism bodies having equal section outermost to the two sides of the center plane and a strip-like flange 13 and 13' is equipped below the side plane relatively parallel to the edge, respectively.

The side frame 3 comprises the left and right heat-dissipating strips 31 and the upper and lower end enclosures 32, which are connected to form a rectangular frame. The two heat-dissipating strips 31 are made of heat-conducting metal materials, such as aluminum alloy and copper alloy, and the length thereof is slightly shorter than that of the light-reflecting sheet 1. The two end enclosures 32 are made of organic glass, polycarbonate (PC) or poly(methyl methacrylate) (PMMA) transparent plastic, with its section being "[" shaped. Slot is available for its internal wall and the two projecting heads are connected with the two ends of the heat-dissipating strips 31 via connecting pieces. Heat-dissipating strips 31 are installed at the side of the lamp groove and thus a collar 33 is equipped below the internal side along its respective length direction and a boss 34 projecting out of the upper part of the internal side and equipped with horizontal groove. When light-reflecting sheet 1 is installed on the side frame, both ends of the light-reflecting sheet are placed on the collar 33, and the ends of the flange 13 and 13' are butt connected with the internal side of the left and right heat-dissipating strips 31 so that the side plane where the flange 13 and 13' is located forms a gap with the internal side of the two heat-dissipating strips 31 and thus forms sunken lamp grooves 14 and 14' parallel and symmetrical to the center plane.

Lamp body 2 is LED, light bulb, electrode tube or prefabricated LED assembly, which are installed in the lamp grooves, respectively. The emitting plane of the LED intersects with the connection line of the apices of the triangles on each section on the prism surface at an inclusion angle of 90-α. Preferably, lamp body 2 is a long-strip prefabricated lamp assembly comprising a plurality of LED bonding dies 21 and circuit board 22, which are directly installed in, or clamped with or embedded into the lamp grooves 14 and 14' formed by the heat-dissipating strips 31 so that the emitting plane of LED bonding die 21 is close to or closely attaches with the internal wall of the lamp groove and intersects with the plane, where the connection line of the apices of the triangles on all sections of the light-reflecting sheet is located, at an inclusion angle of 90-α, thus enabling the light rays from LED bonding die 21 radiate from the two ends of the light-reflecting plate respectively towards the right-angle triangular prism body having equal section at any side bordered with the center plane. The aforesaid LED and LED bonding dies are low-power tubes and a plurality chips can be installed or mounted in one LED bonding die.

Reflecting back plate 5 is a sheet material, which is inserted in the horizontal groove of the boss 34 of the heat-dissipating strips 31 and the slots of the end enclosure 32 via its edge and erected above the light-reflecting plate 1. The reflecting back plate 5 can be made of plastic, paper or metal materials, such as aluminum alloy and copper alloy.

In addition, the sheet lamp also comprises two connecting terminals 29. On end face of the edge outside the lamp groove of the light-reflecting sheet 1 can be equipped with a jack, where the connecting terminals 29 are installed respectively and connected with the lead wire of the long-strip lamp assembly or lamp body 2 via the lead cable. In general, the projecting part of the connecting terminal and the light-reflecting sheet are packaged together inside the slot equipped in the end enclosure 32 and the two ends of the end enclosure 32 are bolt connected with the end faces of the two heat-dissipating strips 31.

In a preferred embodiment, to prevent contact of the heat-dissipating strips 31 with the electricity-conducting parts on the circuit board 22, the heat-dissipating strips 31 are equipped with an extension internal groove 38 along the length direction behind the circuit board 22 and behind the place corresponding to the boss 34. To ensure the airtightness of lamp body 2 or long strip-like lamp assembly, sealing groove 35 is equipped at place where the collar 33 of the heat-dissipating strips 31 contacts with the light-reflecting plate 1, wherein sealing strips are installed inside the seal groove 35 to ensure airtightness. To ensure accurate heat release, horizontal heat-dissipating rib 36 is equipped behind the collar 33 of the heat-dissipating strip 31. To facilitate installation of the reflecting back plate, a plurality of evenly distributed installation bolt holes 37 are equipped at places of the upper surface of the heat-dissipating strip 31 corresponding to the horizontal groove of the boss, which are used to fasten the reflecting back plate 5 by bolts.

The main axis of the light rays emitted by the LED bonding dies (generally called LED) 21 installed inside the lamp groove 14' on one side of the center plane is a beam of light parallel to the smooth surface 12 of the light-reflecting sheet, wherein if there are n triangular prism bodies having equal section on one side of the center plane of the light-reflecting sheet, then each LED bonding die 21 has area A, accordingly. This area A is equally divided into n parts corresponding to the number of the prism bodies 111. If the total photon energy provided is E, then photon energy distributed to each equally divided area is E/A/n to ensure that each prism body 111 on the prism surface 11 can be evenly radiated. The LED bonding dies used by this invention are low-power tubes and a plurality of chips can be equipped with one LED bonding die. The LED multi-chip bonding dies are arranged in a line by way of a matrix and installed in the lamp groove 14 and 14' on both ends of the sheet lamps.

Mathematic expression is used herein to illustrate the optical features of the triangular prism bodies having identical cross section. The inclusion angle α formed by the two straight lines (two planes) AN and HM with the smooth surface can be obtained by drawing parallel lines on the smooth surface through Points A and M (inclusion angle α). The two straight lines (two parallel planes) are AK and ME, as indicated in FIG. 2. Suppose to take parallel line AK as an example, the first triangle FCA on the cross section of the prism body alongside the central axle is a non-isosceles right angle triangle. The vertical line from Point F (apex of the adjacent triangles) to the parallel line is FB, which functions as the squared edge of the right angle triangle, indicated by $h_1$. A series of squared edges $h_2$, $h_3$ . . . $h_{n-1}$, and $h_n$ can be obtained by drawing vertical lines with the parallel line AK from the $2^{nd}$ to n apex of the adjacent triangles, and therefore, $h_1$, $h_2$, $h_3$ . . . $h_{n-1}$, and $h_n$ indicate the vertical distance from the asymmetrical central axle to the apexes of the 1–n triangles on one side. BA is a section of the sectional triangle on the parallel line AK and also functions as another squared edge, and is equal to the gap δ of the sectional triangle in the length direction. Therefore, from the formula $$tg\, \alpha = \frac{FB}{AB} \text{ or } tg\, \alpha = \frac{a}{n \times \delta},$$

the vertical distance $h_1$ from the apex of the triangle adjacent to the first right triangle on one side of the central axle to the parallel line AK can be obtained. For FB=$h_1$, BA=δ, then $h_1$=δ×tgα. Similarly, it is available to obtain the vertical distance $h_2$, $h_3$ . . . $h_{n-1}$, and $h_n$ from the apexes of the triangles adjacent to the $2^{nd}$ to No. n right angle triangles to the parallel line AK. For example, the No. n triangle on one side of the central axle is $$tg\, \alpha = \frac{hn}{n \times \delta},$$

wherein hn is the vertical line made from the apex of the No. n adjacent sectional triangle to the parallel line AK, and H is the height or diameter of the LED bonding die. Usually, hn is equal to H so that the LED bonding die can irradiate the light-receiving marginal surface of each triangle in its height direction via the vertical distance of the apex of the adjacent triangle functioning as the main axle passage of the emitted light beams and provide adequate photon energy.

Figure 3A:
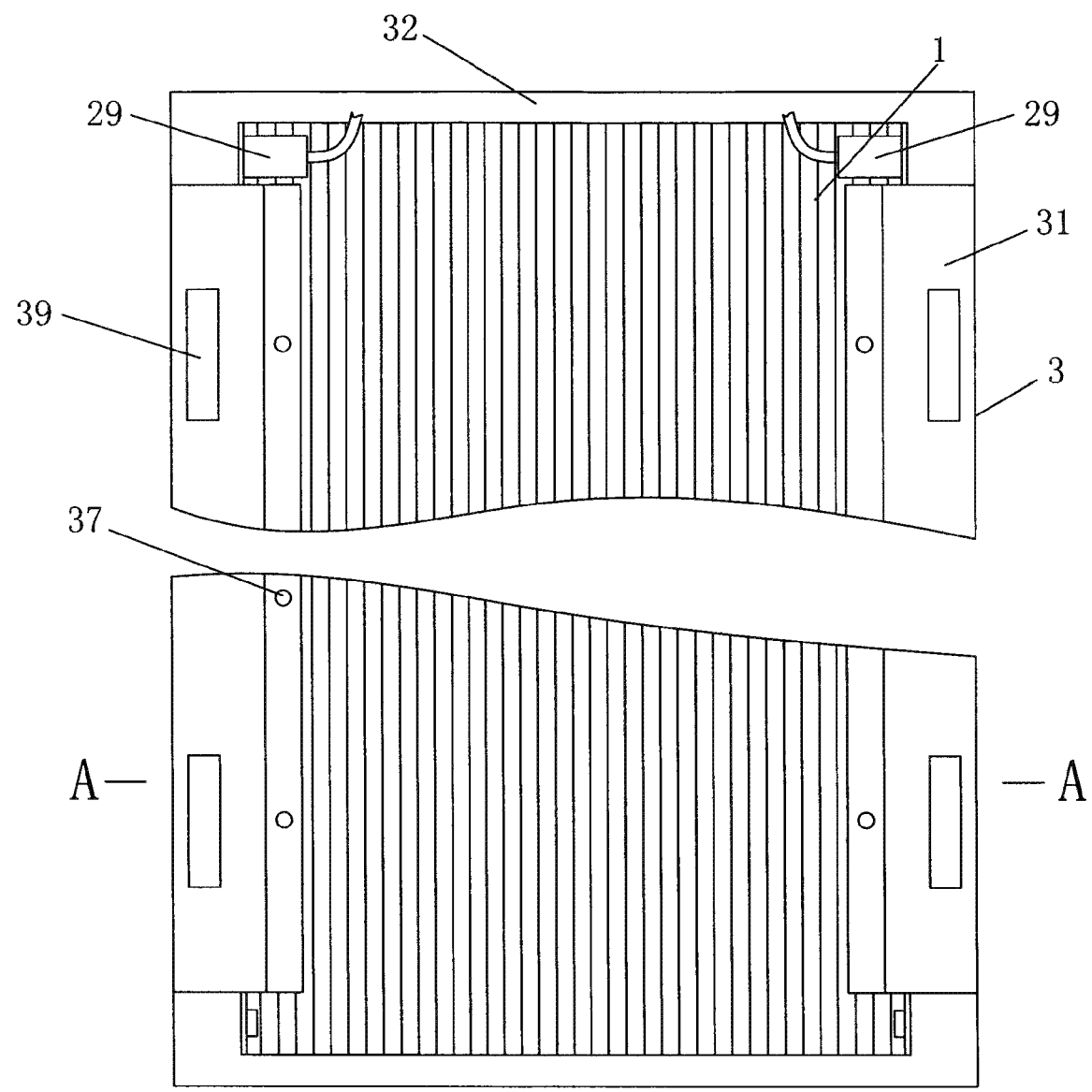
FIG. 3a is the front view of the first sheet lamps.
Figure 3B:
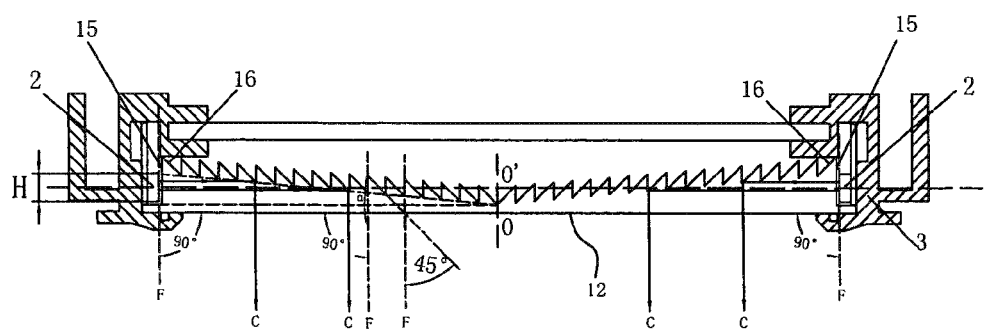
FIG. 3b is the sectional view of FIG. 3a along A-A direction, indicating the design structure of a prism body on the prism surface of the sheet lamp and the optical path analysis under LED radiation.
Figure 4A:
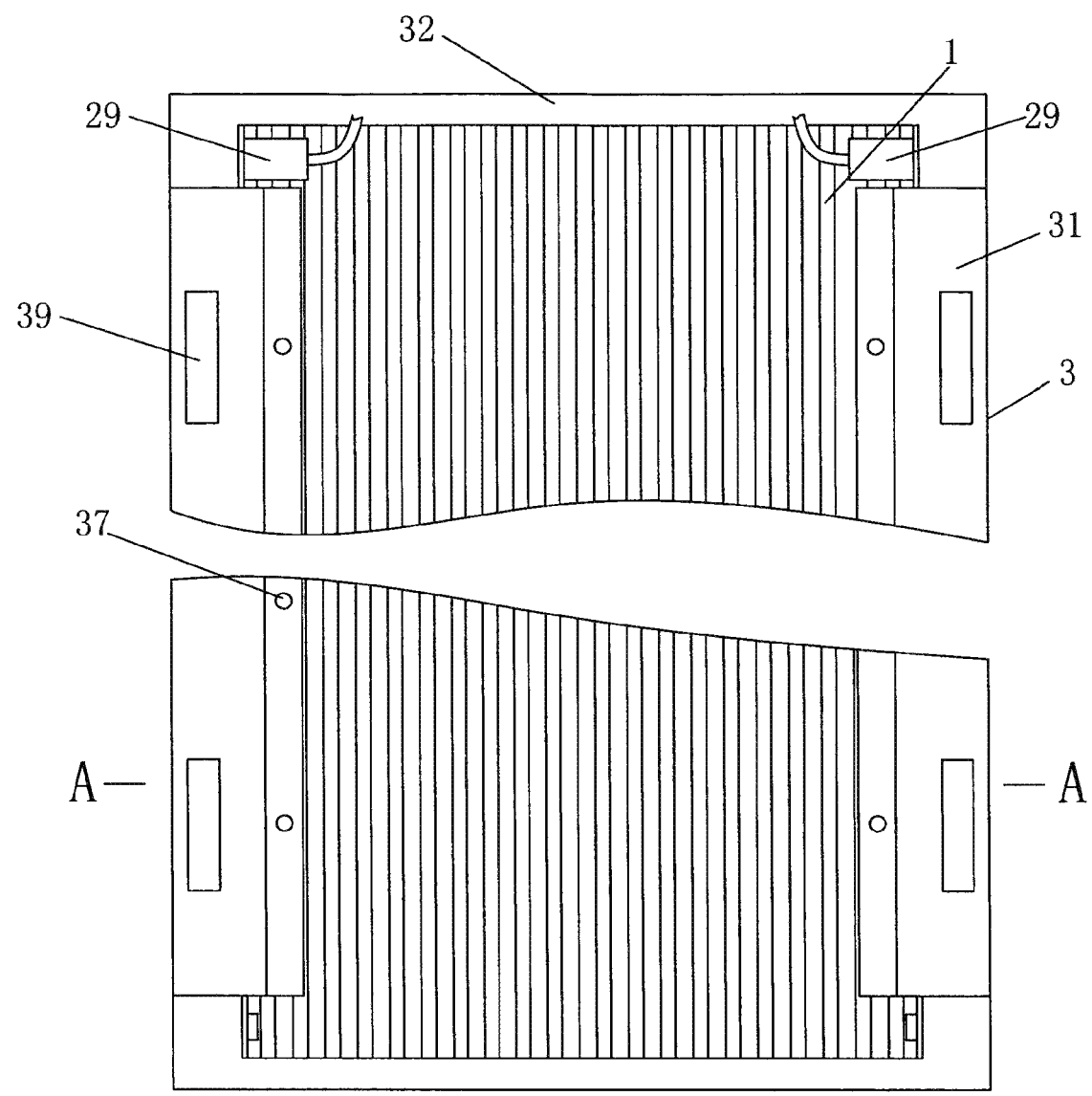
FIG. 4a is the front view of the second sheet lamp.
Figure 4B:
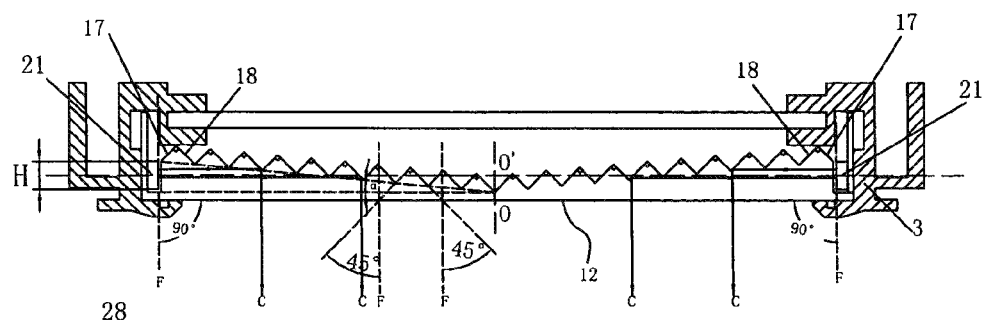
FIG. 4b is the sectional view of FIG. 4a along A-A direction, indicating another design structure of a prism body on the prism surface of the sheet lamp and the optical path analysis under LED radiation.
Figure 5A:
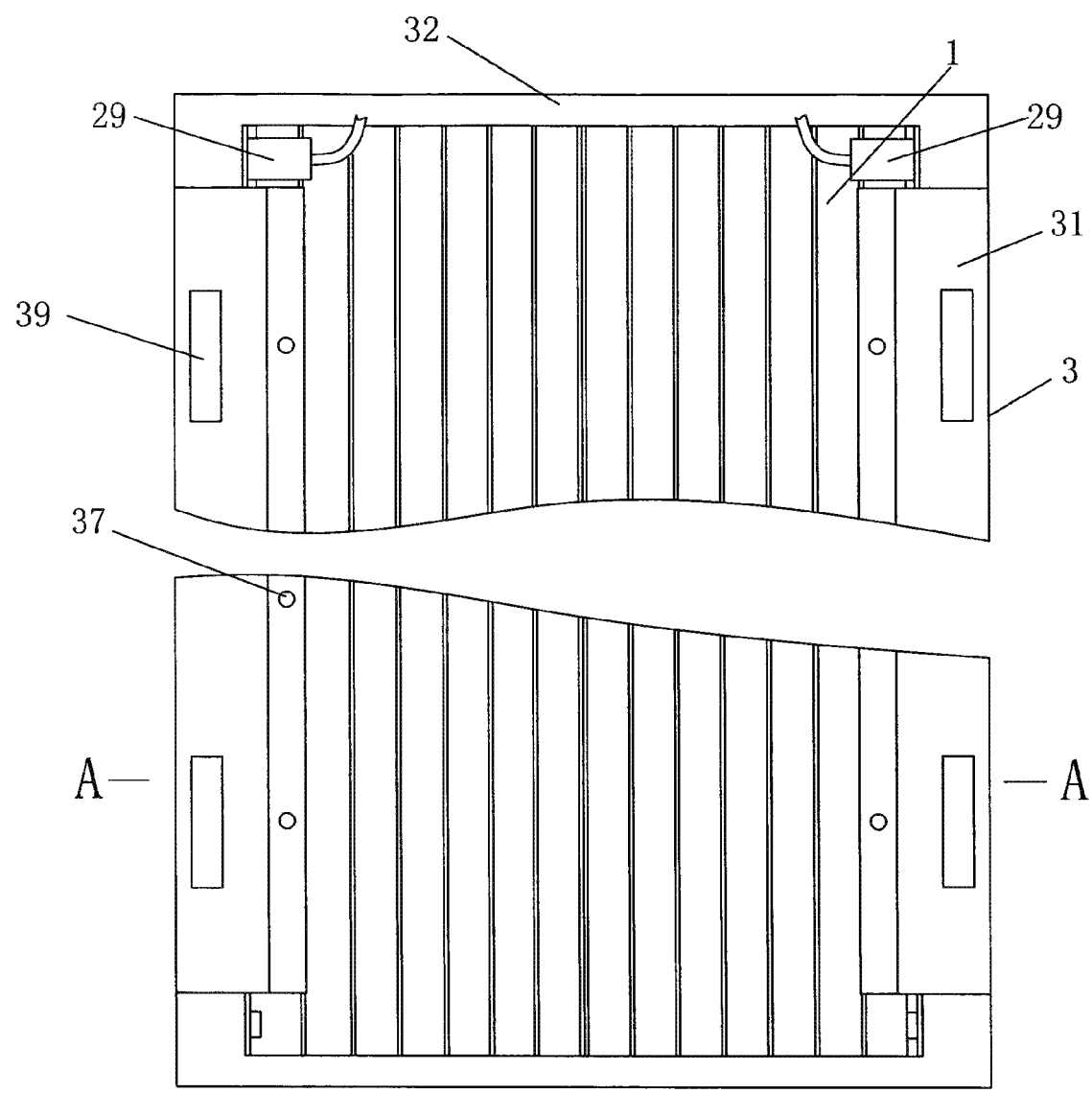
FIG. 5a is the front view of the third sheet lamp.

Refer to FIG. 3 to FIG. 5. Among them, FIG. 3a, FIG. 4a and FIG. 5a show that there are two terminals 29 equipped with the sheet lamp and the light-reflecting plate 1 has a receptacle respectively on the end face of the edge outside the lamp groove, wherein the terminals 29 are respectively installed in the receptacles and electrically connected with the leading wire of the strip-type lamp assembly 2 so that external power supply can be connected with the terminals 29. In fact, FIGS. 3 to 5 illustrate the design of the triangles having identical cross section and symmetrical in the center of the sheet lamp. First, FIG. 3a and FIG. 3b show that the triangle having identical cross section of one of the sheet lamp is a 45° triangle, wherein the two triangles arranged left and right of the central axis OO' have respectively outward-going vertical squared edges 15 (from which the LED light irradiates into the edge or surface of the prism) and inward-going inclined edges. These inclined edges face towards the LED irradiation direction (LED optical axis) or are adjacent to the light, and therefore, they are defined as marginal edge (marginal surface) or light-receiving marginal edge (or marginal surface) 16. For these light-reflecting plates having identical triangular cross sections, the normal line of each right-angled triangular prism body intersects with the extension line of the light-receiving marginal edge and forms an inclusion angle of 45°.

FIG. 4a and FIG. 4b show that the triangle having identical cross section of the second sheet lamp is non-isosceles right-angled triangle, wherein the two right-angled triangles arranged on the right and left of the central axis OO' are two squared edges facing inward and outward respectively. Among them, the outward-facing edges or surfaces, namely the edges from which the LED light irradiates through the prism, are defined as irradiation squared edge 17 and the facing inward squared edges in the direction of the irradiation direction of LED (LED optical axis) are defined as marginal edges or light-receiving marginal edges 18. For these light-reflecting plates having non-isosceles right-angled triangles, the normal line F of each right-angled triangular prism body intersects with the extension line of the light-receiving marginal edge 18 and forms an inclusion angle of 45°.

Figure 5B:
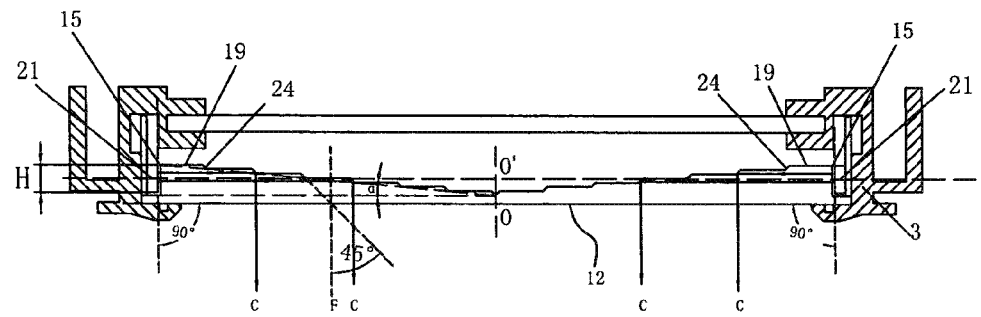
FIG. 5b is the sectional view of FIG. 5a along A-A direction, indicating another design structure of a prism body on the prism surface of the sheet lamp and the optical path analysis under LED radiation.

FIG. 5a and FIG. 5b show that the triangle having identical cross section of the $3^{rd}$ sheet lamp is non-right-angled triangle, wherein the two triangles arranged on the left and right side of the central plane of the central axis OO' have two triangular edges 19 and 24 having different length facing inward and outward respectively. These outward-facing short edges face towards the LED irradiation direction and are defined as marginal edges or light-receiving marginal edges 24. For this kind of light-reflecting plate having identical triangular cross sections, the normal line F of each triangular prism body intersects with the extension line of the light-receiving marginal edge 24 and forms an inclusion angle of 45°.

It can be seen from FIG. 3 to FIG. 5 that how the aforesaid sheet lamps ensure oriented lighting. If the normal line of each triangular prism body in these kinds of light-reflecting plates having identical triangular cross sections intersects with the extension line of the light-receiving line and forms an inclusion angle of 45°, then the sheet lamp with triangular prisms having identical cross section generates can emit the light C which is parallel to the normal line of the smooth surface 12 of the sheet lamp.

Figure 6:
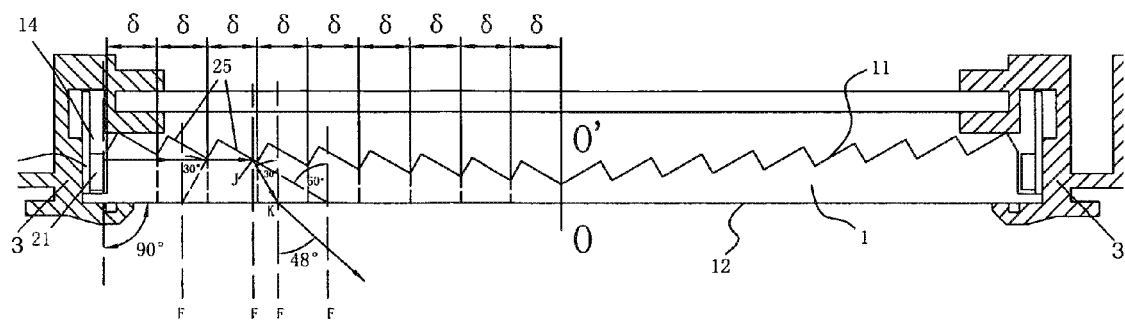
FIG. 6 is the partial sectional view of sheet lamp made of light-reflecting sheets and lamp bodies different from those in FIG. 3 to FIG. 5, indicating analysis for reflection and deflection optical path under LED lighting and radiation.

Refer to FIG. 6, which shows a sheet lamp structural different from those in FIG. 3 to FIG. 5. If an extension line for the light-receiving marginal face 25 of each triangular prism body of the sheet lamp is made and intersects with the smooth surface 12 of the sheet lamp, then the extension line of the light-receiving marginal face 25 forms an inclusion angle of 60° with normal line F. The parallel light ray emitted from LED 21 (expressed in arrow) falls on the critical point J of any prism body, and then is completely reflected and deflected towards the critical point K of the smooth surface 12 and the light ray forms an inclusion angle of 30° with the normal line and then the light transmits out of the smooth surface and radiates towards the external space. The transmitting light ray forms an inclusion angle of 48° with the normal line of the smooth surface. Other light rays have the same light range and optical path as the light ray mentioned above. Light is emitted from LED and enters into the triangular prism having equal section from the end face of the prism, which is totally reflected on the optical prism surface and then deflected and transmitted out of the prism to form oriented lighting after being accumulated. Thus a light ray is similar to that of the traditional spotlight, but is different from the light which is parallel to the normal line as shown in FIG. 3 to FIG. 5.

The spotlight-like light generated by the sheet lamp of this invention is different from that generated by the traditional spotlight because the lamp of invention can generate light having certain projection angle without adjusting the position of the main axis of the emitting lighting fixture. This is the special functions and design basis for sheet lamp with triangular prism having equal section.

The sheet lamps made of the aforesaid light-reflecting plates having triangles of different cross sections can emit light from the smooth surface at certain angle and can be concentrated to form oriented lighting. Therefore, the term "oriented lighting" refers to the combination of the emitting lights from the light-reflecting plate with triangular prisms having identical cross section and installed with LED, which form inclusion angles with the normal line of the prism plane. Any of the sheet lamps with triangular prism having identical cross section in FIG. 3 to FIG. 6 can emit light which forms an oriented inclusion angle with the normal line of the smooth surface. Therefore, as one-spot light source, either the LED bonding die 21 or multi-chip LED bonding die can emits lamplight to n triangular prism bodies having identical cross section respectively. Then it forms a strip-type emitting light after being reflected and refracted by the light-receiving marginal edge and smooth surface. A plurality of strip-type emitting light from the LED bonding dies are closely arranged and distributed on the overall surface to form a surface irradiation light having high luminance. This illustrates the main principles why the sheet lamp of the invention can be used to replace the traditional incandescent and fluorescent lamps.

Refer to FIG. 7 to FIG. 12. The three sheet lamps with triangular prism having equal section as shown in the figures are common in that the extension lines 16, 18 and 24 of the light-receiving marginal face or marginal edge all form an inclusion angle of 45° with the normal line of the smooth surface 12 and emit outgoing light rays parallel to the normal line of the smooth surface. However, for the three sheet lamps with triangular prism having equal section as shown in FIG. 6, the light-receiving marginal face 25 forms an inclusion angle of 60° with the normal line of the smooth surface 12 and emits outgoing light rays with an inclusion angle greater than 45° with the extension line of the normal line of the smooth surface, which means they are correlated but also different.

Figure 7:
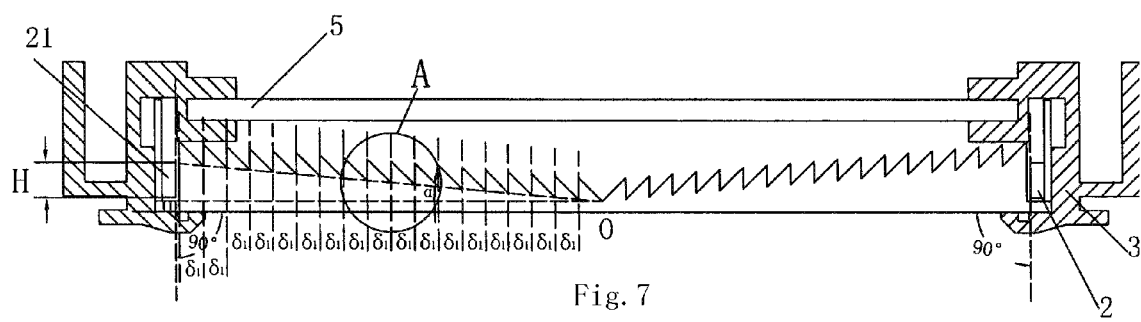
FIG. 7 is a relational view showing the interval of the triangular prism bodies on one side of the central axis of the sheet lamp in FIG. 3b along the length direction and the inclusion angle between the connection line of the apices of the adjacent triangles and the horizontal line.
Figure 8:
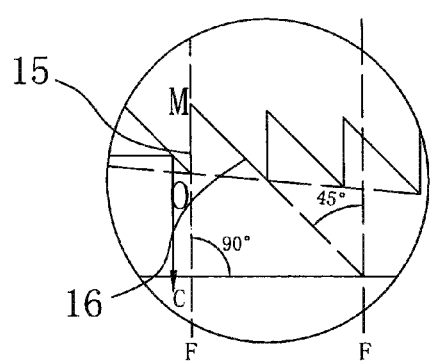
FIG. 8 is the enlarged A view of FIG. 6, indicating the light-receiving marginal face of the prism body is the inclined side of the right triangle and intersects with the normal line of the prism to form an angle of 45°.
Figure 9:
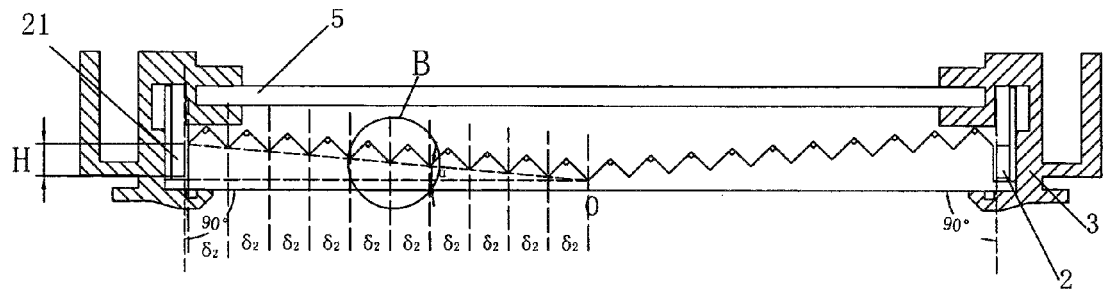
FIG. 9 is a relational view showing the interval of the triangular prism bodies on one side of the central axis of the sheet lamp in FIG. 4b along the length direction and the inclusion angle between the connection line of the apices of the adjacent triangles and the horizontal line.
Figure 10:
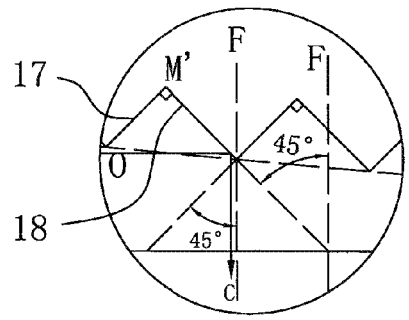
FIG. 10 is the enlarged B view of FIG. 9, indicating the light-receiving marginal face of the prism body is the inclined side of the right triangle and intersects with the normal line of the prism to form an angle of 45°.
Figure 11:
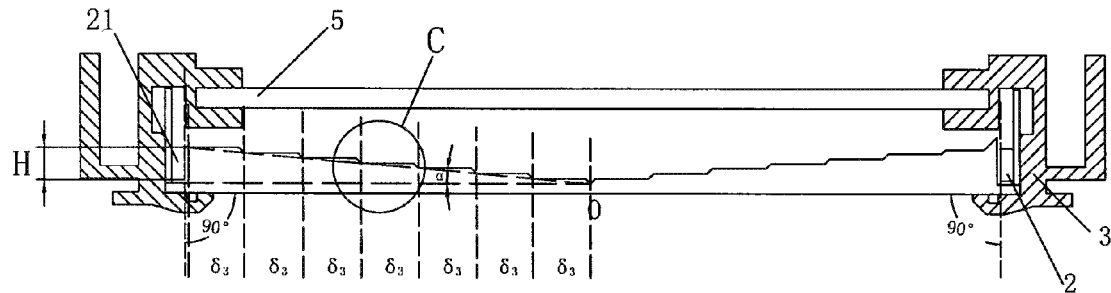
FIG. 11 is a relational view showing the interval of the triangular prism bodies on one side of the central axis of the sheet lamp in FIG. 5b along the length direction and the inclusion angle between the connection line of the apices of the adjacent triangles and the horizontal line.
Figure 12:
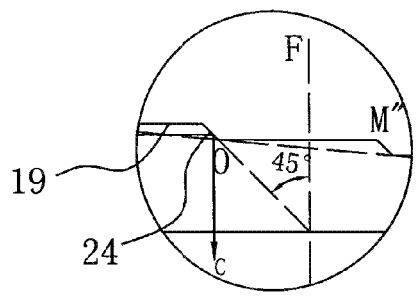
FIG. 12 is the enlarged C view of FIG. 11, indicating the light-receiving marginal face of the prism body is one triangular side and intersects with the normal line of the prism to form an angle of 45°.

To clarify their correlation, FIGS. 8, 10 and 12 are partial enlargement view of FIGS. 7, 9 and 11. Now let's see the evolution of the prism bodies on the three sheet lamps with triangular prism having equal section.

Through analysis, the inclusion angle between the extension line of the light-receiving marginal face of the triangular prism having equal section and the normal line of the smooth surface of the prism is 45°, which is common to the three sheet lamps with triangular prism having equal section. The light rays produced by these sheet lamps are parallel to the normal line of the smooth surface, as shown in FIGS. 3, 4 and 5.

FIG. 8 is the partially enlarged drawing of the prism body. In this figure, one of the vertical surface or edge OM (15) of the triangular prism is the squared edge from which the LED light passes through the prism and the distances of the right-angled triangles are $\delta 1$ respectively in their length direction. FIG. 10 shows the squared surface or edge OM' (17) from which the LED light from the right-angled triangular prism passes through the prism and the distances of the right-angled triangles are $\delta 2$ respectively in their length direction. FIG. 12 shows the squared surface or edge OM" from which the LED light from the right-angled triangular prism passes through the prism and the distances of the right-angled triangles are $\delta 3$ respectively in their length direction. Therefore, it must be noted that among these prism bodies, the distance of the triangles of the light-reflecting plate shown in FIG. 7 in its length direction is $\delta 1$ which is the shortest on the light-reflecting plates with same width to ensure that the triangular prisms having identical cross section have the same area, whether they are right-angled or non-right angled triangles. The triangles on the light-reflecting plate shown in FIG. 11 have the longest distance of δ3 in their length direction. However, the right-angled triangles of the light-reflecting plates shown in FIG. 9 have the distance of δ2 in their length direction, which lies between δ1 and δ3. Therefore, a plurality of triangular prism edges can be arranged on the light-reflecting plate of FIG. 7, while fewer triangular prism edges can be arranged on the light-reflecting panel shown in FIG. 11. Accordingly, for the light-reflecting sheet with the same width, the more the triangular prism edges are, the more the outgoing light rays and the stronger the light rays will be and vice versa.

Refer further to FIGS. 7, 9 and 11. It can be seen that LED bonding die 21 is accurately positioned in the lamp grooves 14 and 14'. The light axis of LED bonding die is parallel to the plane of the sheet lamp. The parallel light rays emitted out from LED bonding die fall on the marginal points of the triangular prism arranged in sequence and result in total reflection, which are transmitted out from the smooth surface of the prism to form oriented lighting parallel to the normal line of the smooth surface.

Figure 13:
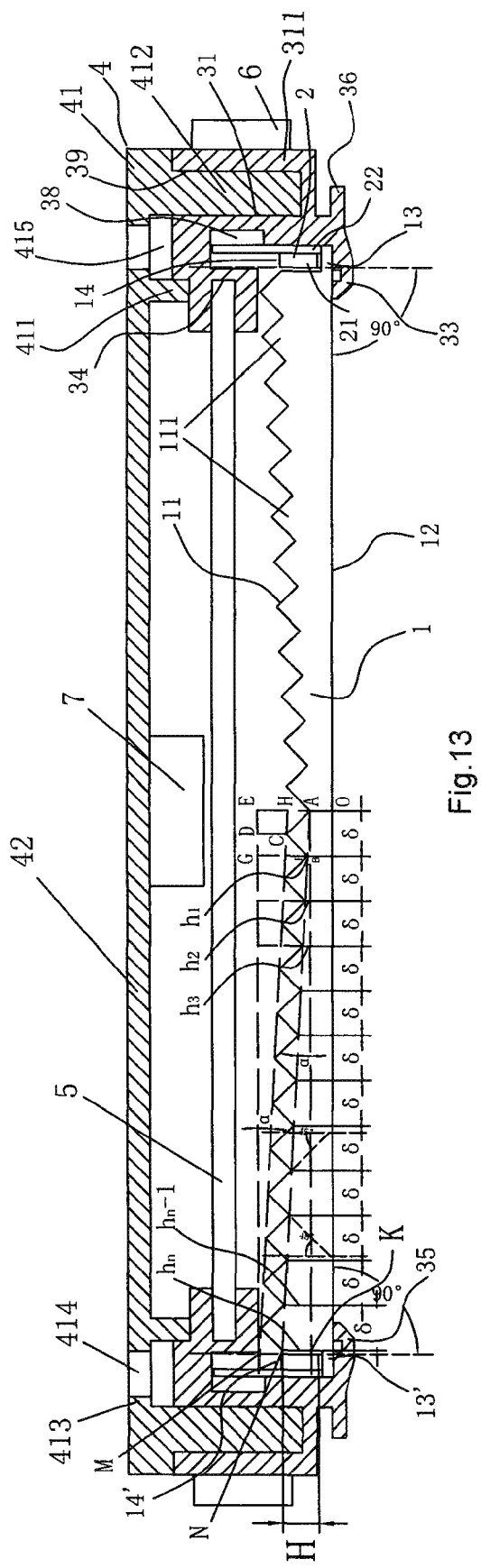
FIG. 13 is the sectional view of the sheet lighting fixture made from the sheet lamp in FIG. 2.

Refer to FIG. 13. According to one of the embodiments of the invention, in addition to the light-reflecting sheet 1, a plurality of lamp bodies 2, side frame 3 and reflecting back plate 5 common to the sheet lamps, the sheet lighting fixture made from the sheet lamps mentioned above further comprises a bottom frame 4, and constant current source 7, wherein the bottom frame 4 is a rectangular frame made of metal materials and with a plurality of metal strips 42 crossed over its left and right frame strips 41. The left and right frame strips 41 are arranged symmetrically, the lower surface of which is equipped with 2-4 short rectangular raised parts 411 projecting downward relative to the internal side and two long rectangular raised parts 412 projecting downward located outside. Accordingly, the left and right heat-dissipating strips 31 of the side frame 3 are close to the heat-dissipating side and are equipped along the length direction with 2-4 long grooves 39 matching with the long raised parts. Therefore, when the bottom frame 4 is mounted on the heat-dissipating strip 31 of the side frame, its long raised parts 412 can be inserted into the long groove 39 on the heat-dissipating strip 31 of the side frame and its short raised parts 411 can be relied on the upper surface of the boss of the side frame. Moreover, a rectangular space 415 is formed between the lower surface of the interval 413 between the frame strips of the short raised part 411 and the long raised part 412 and the corresponding surface of the side frame. Therefore, on the one hand, a plurality of bolt installation holes 414 are equipped along the length direction of the interval between the short raised part 411 and its long raised part 412 of the side frame 4 so that they can be preset or mounted on the indoor and outdoor sheet walls and bolt heads can be pre-buried in the rectangular space 415. On the other hand, the bottom frame 4 and the heat-dissipating strip 31 are equipped with a plurality of corresponding conical holes and bolt holes along the length direction of the long raised part inserted into the bottom frame of the long groove 39 and the external wall 311 of the long groove and are relatively fastened by center pin 6 so that the sheet lamp and the bottom frame 4 are connected together.

LED constant current source 7 is mounted on the metal strip 42 of the bottom frame 4 via connecting pieces, the output terminal thereof is connected with the connecting terminal 29 and the input terminal thereof is connected with the power supply via the power jack.

In addition, to ensure that the sheet lamp will not become very hot after long time use, aluminum alloy with ideal heat-conducting performance is equipped at the edges along the length direction of the lamp groove of the light-reflecting sheet and heat-dissipating ribs 36 are arranged relatively parallel to the edge part.

The $2^{nd}$ Embodiment

Figure 14:
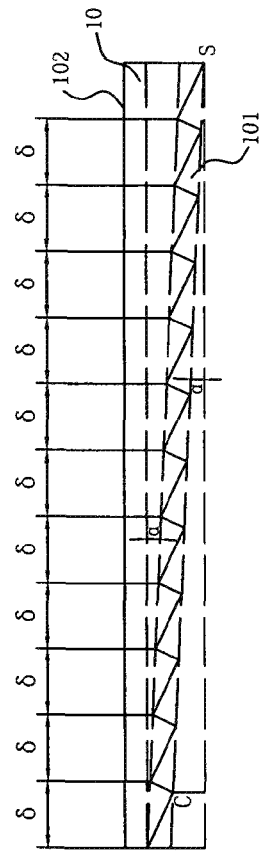
FIG. 14 is the sectional view of the light-reflecting sheet with triangular prism having equal section, indicating unidirectional zigzag arrangement from one side to another side of the light-reflecting sheet.
Figure 15:
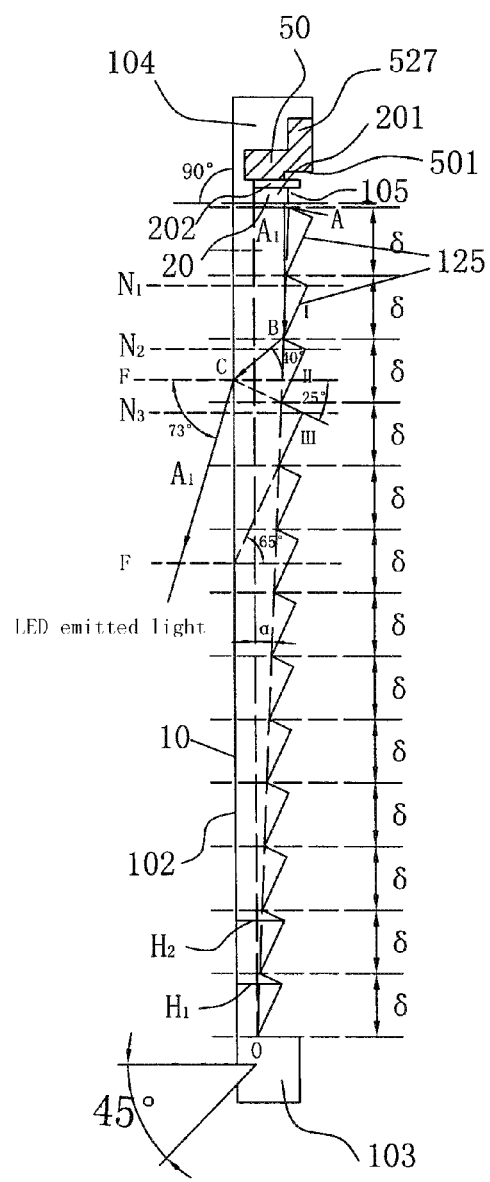
FIG. 15 is the reflection and deflection optical path view under lighting and radiation by LED made of the light-reflecting sheets in FIG. 14.

Refer to FIG. 14 and FIG. 15. In the $2^{nd}$ embodiment of the invention, for the light-reflecting sheet 10 with triangular micro prism having equal section and the sheet lamps made therefrom, the shape of the sectional triangle of the prism, the materials for the light-reflecting sheets, the structural features of the sheet lamps, the types of lamp bodies and the operating principle of the sheet lighting fixture are essentially the same with those in the first embodiment, except that the prism bodies on the prism surface are unilaterally and non-symmetrically arranged. Therefore, reference is made to the first embodiment for those same portions. It must be pointed out that FIG. 14 mainly differs in that a plurality of parallel strip-like micro prism bodies are arranged from one side to another side on one surface of the prism surface 101 of the light-reflecting sheet and the distance from the apices of the triangles arranged from left to right or from right to left to another surface of the of the smooth surface 102 of the light-reflecting sheet or the vertical line made from these apices to the smooth surface is successively increasing or decreasing. Further, the connection line of the apices of the micro prism bodies is a straight line CS, other than two straight lines for the symmetrical structure in the first embodiment. Therefore, the straight line CS intersects with the inclined line of the smooth surface of the light-reflecting sheet and forms an inclusion angle of α. The cross section of each micro prism body is triangle, including right and non-right-angle triangle. The micro prism bodies are zigzag arranged and have the same cross section and shape. The size of the inclusion angle α and the distance for all right-angle triangles along the length direction are the same with those in the first embodiment.

Refer to FIG. 15. According to this embodiment, the sheet lamp made from the light-reflecting sheet mentioned above comprises a light-reflecting sheet, a plurality of lamp bodies and a heat-dissipating strip 50, wherein the light-reflecting sheet 10 mainly differs from that in the first embodiment in that the light-reflecting sheet 10 is left with outward edges 103 and 104 outside the outermost two or one right-angle prism bodies on its left and right sides. The edge 104, that is the part where the apex of the triangle among the micro prism bodies of the light-reflecting sheet is farthest outside the micro prism body of the smooth surface, is equipped with long strip-like flange, which is equipped with long groove having right-angle turn on one side of the prism surface parallel to the prism body. That is to say, the shape of the long groove changes with the shapes of the heat-dissipating strips. The heat-dissipating strip 50 is made of heat-conducting metal materials and the section thereof can be of rectangular or angular shape. In this embodiment, a heat-dissipating strip 50 with angular shape is taken as an example, which is complementarily mounted on the upper right-angle turn of the long groove and the surface on one side of which exposing outside the long groove is the heat-dissipating side equipped with parallel heat-dissipating ribs 527 and the lower surface of which forms an interval with the corresponding long groove wall and thus forms a sunken lamp groove 105. The lamp body includes LED, light bulb, electrode tube or prefabricated lamp assembly having a plurality of LEDs, which are mounted in the sunken lamp grooves, respectively.

In addition to LED, light bulb or electrode tube, the lamp body can be lamp assembly 200 comprising a plurality of LED bonding dies 201 and circuit board 202, which can directly installed or embedded into the sunken lamp groove 105, respectively so that the LED emitting plane in the lamp groove intersects with the connection line of the apices of the right-angle triangles close to the plane of the light-reflecting sheet and thus forms an inclusion angle of 90-α. It must be noted that on the face of the heat-dissipating strip 50 corresponding to the electricity-conducting parts of the circuit board of the lamp assembly is equipped with a long groove 501 to prevent the heat-dissipating strip from contacting with the electricity-conducting parts of the circuit board.

The way to realize oriented lighting by the sheet lamp mentioned above is the same with that in the first embodiment. In designing the triangles having equal section for the light-reflecting sheet, the normal lines of all triangular prism bodies intersect with the extension line of the light-receiving marginal edge and form an inclusion angle of 65°, and then the sheet lamp can produce light rays at 73° angle with the normal line of the smooth surface of the prism sheet lamp under the radiation by the LED bonding dies.

Refer to FIG. 14, which shows a structural design chart for a non-symmetrical sheet lamp different from that in FIGS. 3-5 which emits the outgoing light rays of the prism parallel to the normal line and from that in FIG. 6 which emits the outgoing light rays of the prism forms 48° angle with the normal line. The extension line for the light-receiving marginal face 125 of each triangular prism body of the sheet lamp intersects with the smooth surface 102 of the sheet lamp and the extension line of the light-receiving marginal face 125 forms an inclusion angle of 65° with the normal line F. The parallel light ray AB emitted from LED bonding dies 201 falls on the critical point B of the prism body I and then is deflected towards the critical point C of the smooth surface 102 through total reflection, which forms an inclusion angle of 40° with the normal line and is transmitted out of the smooth surface. The transmitted light ray forms an inclusion angle of 73° with the normal line of the smooth surface. The light range or path for other light rays is the same with that of light ray A1, which is emitted out from LED and enters into the triangular prism having equal section from the prism end face and results in total reflection on the I, II, III, . . . prism surfaces before being transmitted out of the prism to form oriented lighting. The lighting is like that of the traditional spotlight, but different in that the angle of its outgoing light ray (inclusion angle between extension line of light-receiving marginal face 125 and normal line changes) is different from the angle of the outgoing light rays in FIG. 6.

The sheet lighting fixture made of the sheet lamps mentioned above has the same structure as illustrated in detail in the 2$^{nd}$ embodiment of FIG. 15, and comprises a sheet lamp having equal three right-angled triangular section and a bottom frame 30, wherein the difference mainly lies in that the prism bodies on the light-reflecting sheet 10 of the sheet lamp is arranged unilaterally and there are two lamp grooves, in addition to that the bottom frame 30 is slightly modified with its enclosure wall so as to adapt to the installation of the sheet lamps, and all other aspects are essentially the same as those of the 2$^{nd}$ embodiment.

In sum, whether in the first or the second embodiment, LED is closely attached with the plane of a lamp groove where the prism board is vertical to the smooth surface. We know that there is slight gap between LED bonding die and prism surface, but we can regard that the light-emitting face of LED bonding die has been thoroughly integrated with the prism and entering of LED photon beams into the prism can be regarded as the internal transmission of light rays. Then LED photon beams cause total reflection at the light-receiving marginal position of the prism and then are transmitted out of the prism surface, thus achieving transformation from point light source of LED to line light source and finally area light source, the process of which is accomplished in the same media by the LED photon.

Figure 16:
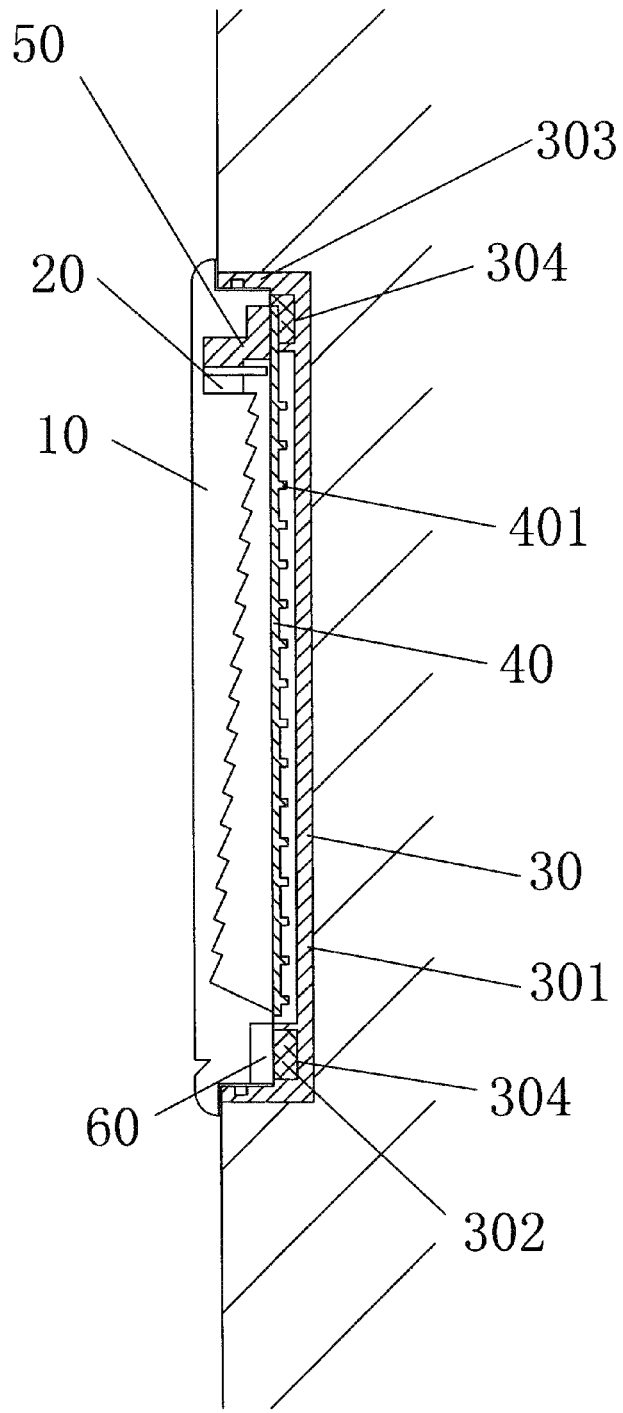
FIG. 16 is the sectional view of the sheet lighting fixture made by the sheet lamp in FIG. 15.

Refer to FIG. 16. The sheet lighting fixture made according to the sheet lamp of this invention comprises three right-angled triangular sheet lamps having equal section (comprising light-reflecting sheet 10, lamp assembly 20 and heat-dissipating strip 50), and bottom frame 30. It must be noted that the sheet lamps of the first and the second sheet lamps differ only in their rectangular or square appearance, and thus what changes is the dimension of the bottom frame 30 and there is nothing to do with the symmetrical or non-symmetrical structure of the prism bodies. Therefore, the sheet lighting fixture of the second embodiment is taken as an example. In the sheet lighting fixture, the bottom frame 30 comprises a retaining frame 301 and retailing pieces 302.

Enclosure wall 303 is equipped on the front surface of the retaining frame 301 and a plurality of magnetic installation holes 304 are equipped on the rear internal surface for mounting the retailing pieces 302. The retaining pieces 302 are a plurality of magnetic blocks, which are mounted in the respective installation holes 304. The retaining frame 301 is a shell that can be mounted on any indoor and outdoor walls via the connecting pieces. The one or two ends of the light-reflecting sheet 1 are equipped with metal material blocks 60, which are made of metal materials that can be absorbed by magnetic blocks and are mounted corresponding to the magnetic block in the retaining frame 301. In addition, it also comprises a thin heat-dissipating protective back plate 40, used for compensate the scattered or strayed light on the prism surface by reflection, which is mounted between the sheet lamp and the bottom of retaining frame 301. The protective back plate 40 can be made of heat-conducting materials such as plastic, paper, aluminum foil or other metal materials. One of its polished surface functions as the reflecting back plate and a plurality of heat-dissipating ribs are arranged on the other surface. The LED is lit up by low-voltage DC transformer so that the emitted light rays form lighting rays on the smooth surface via the prism bodies mentioned above.

The sheet lighting fixture of the invention features simple structure and the total thickness of the oriented lighting fixture is 20 mm. The sheet lamps are fastened on the bottom frame by magnetic, featuring simple installation and recycling use of sheet lamps and materials for bottom frame.

Figure 17:
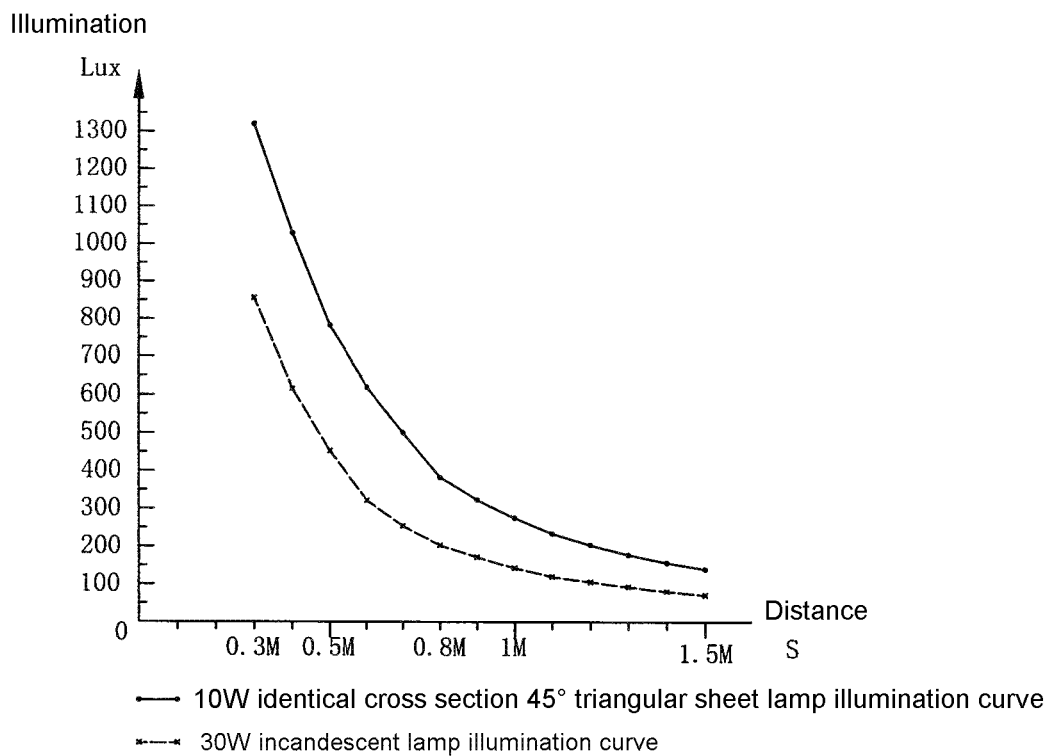
FIG. 17 is the comparison curve chart for illumination within 0-1.5 m range between 10 W sheet lamp of the invention and 30 W fluorescent lamp.
Figure 18:
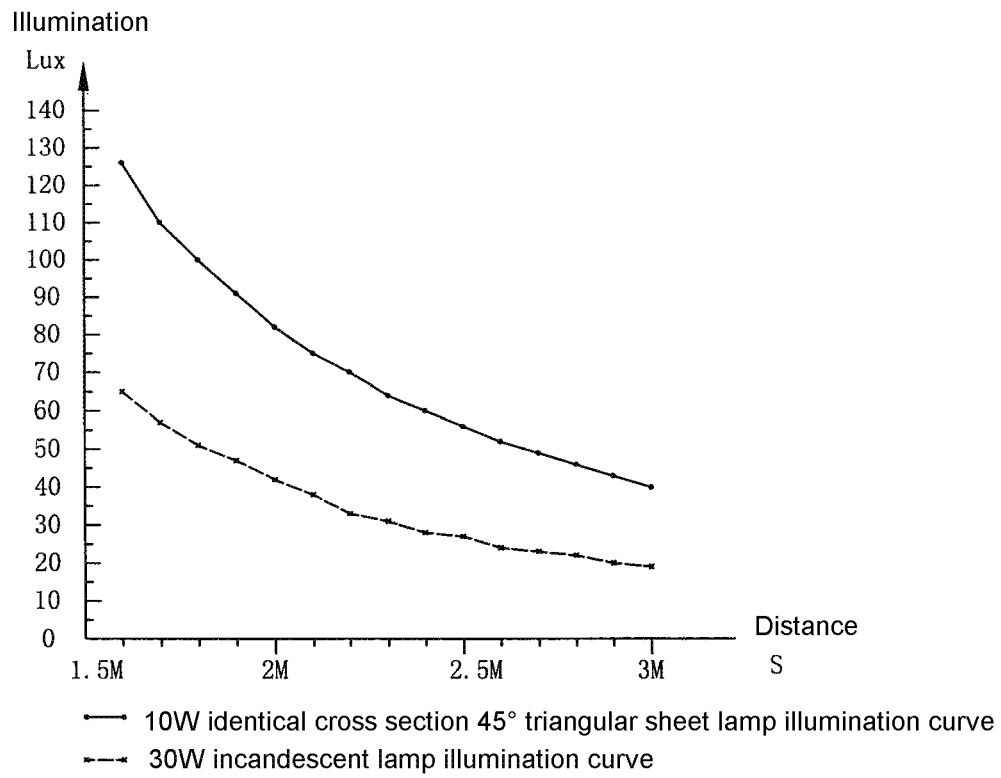
FIG. 18 is the comparison curve chart for illumination within 1.5-3 m range between 10 W sheet lamp of the invention and 30 W fluorescent lamp.

Refer to FIGS. 17 and 18, which compares the luminance curves of 10 W sheet lamp of this invention and 30 W incandescent lamp within different ranges. Black dots and black solid connecting lines are used to show the luminance of the 10 W sheet lamp within certain range, while black cross and black dotted lines are used to show the luminance of the 30 W incandescent lamp within certain ranges. Moreover, the vertex angle of the triangular prism body having equal section of the 10 W sheet lamp is 45° (in the form as shown in FIG. 3). According to the test results, the luminance of the 10 W sheet lamp within 0.5-1.5 m ranges from 1320 Lux to 140 Lux, while that for the 30 W incandescent lamp reduces from 855 Lux down to 71 Lux; the luminance for 10 W sheet lamp within 1.5-3 m ranges from 140 Lux to 40 Lux, while that for 30 W incandescent lamp from 71 Lux to 19 Lux. Therefore, the LED oriented sheet lamp with triangular prism having equal section of this invention can provide optimum lighting brightness, especially its luminance can reach 40 Lux even at 3 m distance. Therefore, it can be used as a new light source for the lighting industry and substitute the incandescent lamps, featuring energy conservation, high luminance, low heat release, reasonable structure and easy use.

Figure 19:
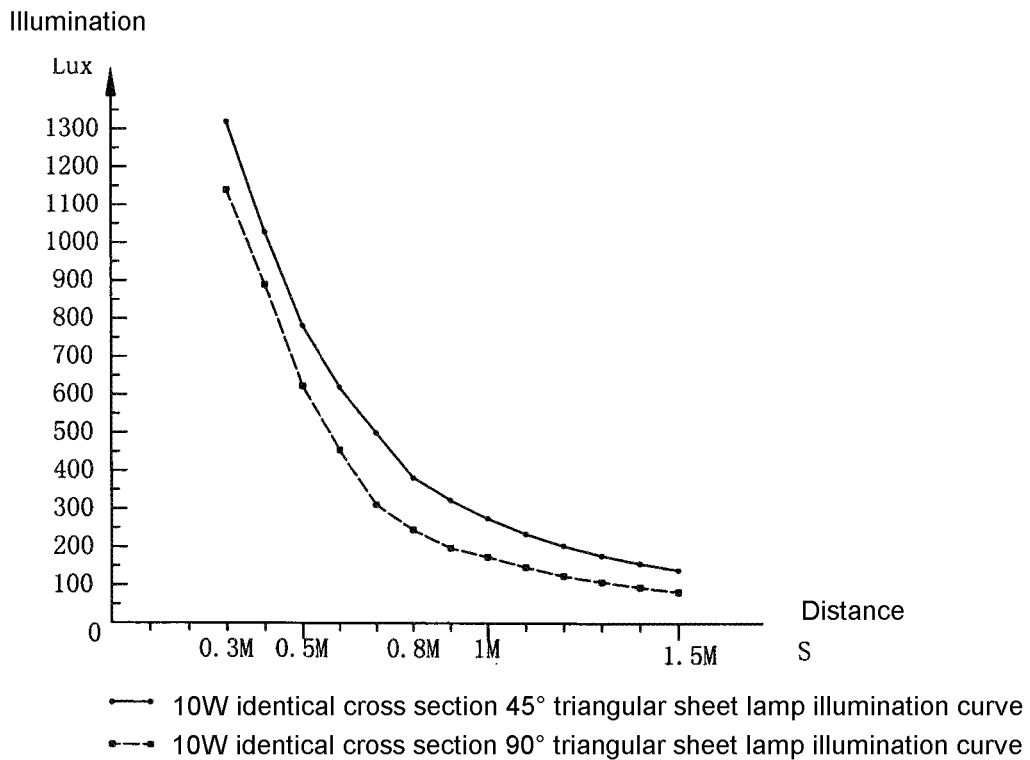
FIG. 19 is the comparison curve chart for illumination within 0-1.5 m between 10 W sheets lamps of different shapes but having equal section in the present invention.
Figure 20:
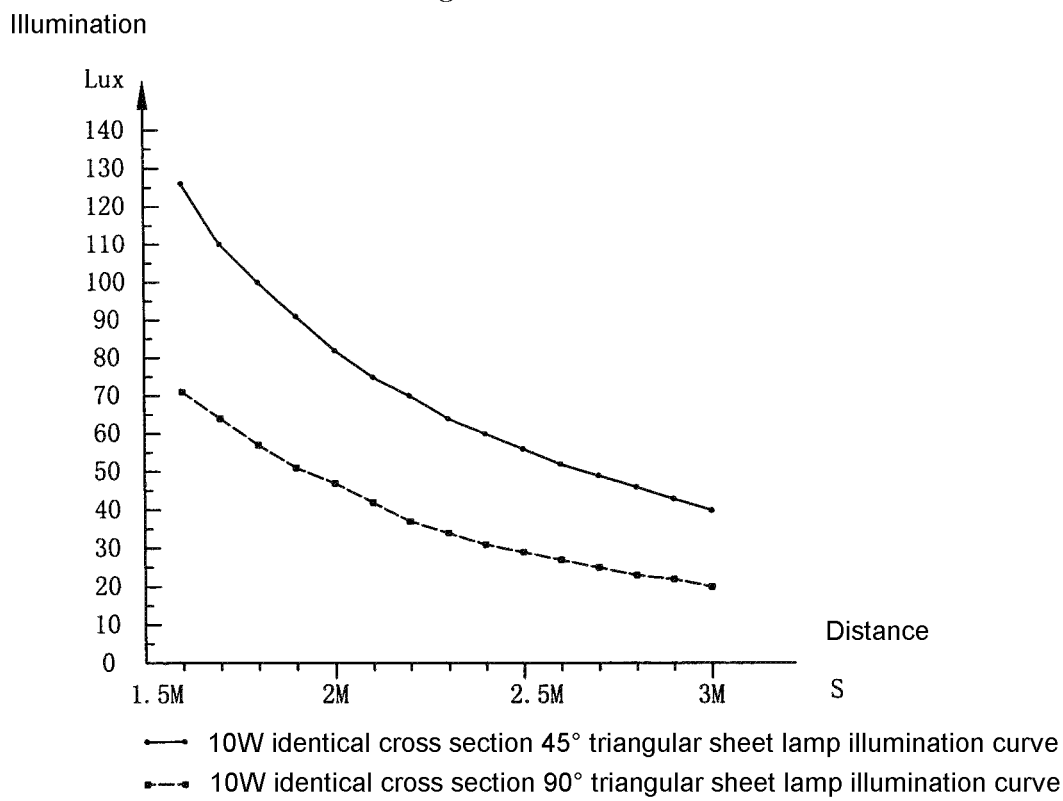
FIG. 20 is the comparison curve chart for illumination within 1.5-3 m between 10 W sheets lamps of different shapes but having equal section in the present invention.

FIGS. 19 and 20 compare the luminance curves of the two kinds of 10 W sheet lamps with triangular prism having equal section but different structures of this invention within 0-1.5 m and 1.5-3.0 m lighting ranges, wherein the black dots and black solid connecting lines are used to show the luminance of the 10 W sheet lamp made of the light-reflecting sheet with 45° vertex angle between the triangular prism bodies having equal section (in the form as shown in FIG. 3) within certain range. Black blocks and black dotted lines are used to show the luminance of the 10 W sheet lamp made by light-reflecting sheet having 90° for the triangular prism bodies with equal section (in the form as shown in FIG. 4) within certain range.

Obviously, through comparison of the luminance between the sheet lamp installed with triangular prism having equal section at 45° vertex angle and that at 90° under the same power as shown in the curves in FIGS. 17 and 18, the luminance for the sheet lamp having 45° vertex angle is greater than that having 90° vertex angle, especially within 1.5-3.0 m range, the 10 W sheet lamp having 45° vertex angle almost doubles the luminance of that having 90° vertex angle, which is attributed to that the number of the marginal faces for the 10 W sheet lamp having 45° vertex angle is just double, compared with the lamp having 90° vertex angle. This also proves that the sheet lamp of this invention is feasible in terms of the guiding principle for the optical design.

The invention claimed is:

1. A light-reflecting plate with triangular micro-prisms having identical cross section, comprising:
a plurality of parallel strip-like micro prism bodies are arranged along the left and right sides starting from the plane of the symmetrical center on the prism surface of the light-reflecting, plate, the cross section of each micro prism body is triangle and the micro prism bodies are continuously arranged in zigzag form, wherein the triangles have the same shape and the same cross sectional area; the left and right apexes of the triangle adjacent to the symmetric center plane have the shortest distance away from another surface which is called the smooth surface of the light-reflecting plate, and the apices of the triangles towards the periphery of the light-reflecting plate have the successively increasing distances away from the smooth surface of the light-reflecting plate; the connection lines among the apices of the triangles of the prism bodies are two inclined straight lines, intersecting at a point with the central axial line of the light-reflecting plate and forming an inclusion angle $\alpha$ with the smooth surface of the plate, wherein the inclusion angle $\alpha$ is less than 45° and the distance of all triangles is equal in the length direction.

2. The light-reflecting plate of claim 1, wherein the apices of the continuously zigzag-formed triangles have successively decreasing distance from the smooth surface and the extension line of the marginal side, which is either of the right side and the left side of the triangles, intersects with the smooth surface relative to the prism surface and forms an inclusion angle with the normal line thereof, ranging from 40° to 90°.

3. The light-reflecting plate of claim 1, wherein the inclusion angle $\alpha$ is less than 10°.

4. The light-reflecting plate of claim 1, wherein the light-reflecting plate has periphery outside the micro prism bodies on both sides farthest to the central plane and strip-like flange is arranged below the parallel side plane relative to the periphery.

5. The light-reflecting plate of claim 1, wherein the light-reflecting plate is made of transparent plastic including polycarbonate (PC) or poly(methyl methacrylate).

6. The light-reflecting plate of claim 1, wherein the triangle is right-angle or non-right-angle triangle.

7. A sheet lamp made from the light-reflecting plate of claim 1, wherein the sheet lamp comprises a light-reflecting plate, a side frame, a reflecting, back plate and a plurality of lamp bodies, wherein the side frame is a rectangular frame comprising the left and right heat-dissipating strips connected with the upper and lower end enclosures, the heat-dissipating strips are respectively equipped lengthwise with a collar projecting, out of the lower part of the internal side face and a boss projecting out of the upper part of the internal side face and equipped with horizontal groove, the light-reflecting plate is installed, on the side frame with its two sides arranged on the collar so that the top end of the flange on the lower part is butt connected with the internal side faces of the two heat-dissipating strips and a gap farms between the side plane where the flange is located and the internal side faces of the two heat-dissipating strips, thereby forming a sunken groove parallel to and also symmetric to the center plane; the section of the end enclosure is of "[" shape, the reflecting back plate is made of plastic, paper or metal materials, which is equipped on the light-reflecting plate by inserting, in the horizontal groove of the boss of the heat-dissipating, strip via the edge; the lamp body is LED, light bulb, electrode tubes or prefabricated LED assemblies and the lamp bodies are mounted in respective lamp grooves; the LED emitting plane intersects with the connection lines of the apices of the sectional triangles on the prism surface and forms an inclusion angle of 90-$\alpha$.

8. The sheet lamp of claim 7, wherein the lamp body is prefabricated strip-like lamp assembly comprising a plurality of LED bonding dies and circuit board, wherein the lamp assembly is directly installed, inserted or embedded in the groove so as to enable the LED emitting plane inside the groove to be closely attached with the internal wall of the groove and forms a 90-$\alpha$ inclusion angle with the plane of the connection line of the apices of the sectional triangles of the light-reflecting plate.

9. The sheet lamp of claim 7, wherein the side of the sectional triangle where the triangular prism body radiates towards the LED or the side adjacent to the light is the light-receiving marginal side and also the light-receiving marginal face of the triangular prism body, wherein the extension line of the marginal side intersects with the smooth surface relative to the prism surface and forms an inclusion angle with the normal line thereof, ranging from 40°-90°.

10. The sheet lamp of claim 7, wherein the main axis of the LED light ray is a light beam parallel to the smooth surface of the light-reflecting plate; when there are n triangular prism bodies on one side of the center plane of the light-reflecting plate and the area of the luminous plane for each LED is A, then the area A is equally divided into n parts corresponding to the numbers of the prism bodies; if the total photon energy provided is E, then photon energy distributed to each equal area is E/A/n so that the light ray emitted by the LED can be evenly radiated on the light-receiving marginal side of any sectional triangle of the center plane or the light-receiving marginal face of the triangular prism body.

11. The sheet lamp of claim 7, wherein the LED and LED bonding dies are low-power tubes and several chips can be installed in one LED bonding die.

12. The sheet lamp of claim 7, wherein the heat-dissipating strip is equipped with an internal groove along the length direction corresponding to the back of the boss behind the circuit board to prevent contact of the electricity-conducting parts on the circuit board.

13. A plate lighting fixture made of the sheet lamp of claim 7, wherein it also comprises a bottom frame and an LED constant current source, wherein the bottom frame is a rectangular frame made of metal materials, on the left and right framing strips of which are crossed with several metal strips and along the length direction of the lower surface of the left and right framing strips are two short rectangular raised parts projecting downward relative to the internal side and two long rectangular raised parts projecting downward located outside; long grooves are equipped on the surface of the left and right heat-dissipating strips of the side frame along its length direction to match with the long raised parts; the bottom frame is installed on the side frame, the long raised parts of the side frame can be inserted into the long grooves of the side frame and the end of its short raised part contacts closely with the upper surface of the boss of the side frame and forms a long rectangular space between lower surface of the interval part of the short and long raised parts and the surface of the side frame corresponding to it; a LED constant current source is installed on the metal strips of the bottom frame via the connecting pieces, and the output terminal thereof is connected with the connecting terminal via the lead wire.

14. A plate lighting fixture of claim 13, wherein along the length direction of the interval of the short and long raised parts are equipped with several bolt holes; the heat-dissipating strips of the bottom and side frames are relatively fastened by fixing the external wall of the long groove with the long raised part of the bottom frame of the long groove, in which the heat-dissipating strips are inserted, using center pins via the conical holes and bolt holes equipped along the length direction.

15. A sheet lamp made by a light-reflecting plate with triangular micro-prisms having identical cross section, comprising:

a plurality of parallel strip-like micro prism bodies arranged from one side to another side on one of the prism surface of the light-reflecting plate, the cross section of each micro prism body is triangle and the micro prism bodies are continuously arranged in zigzag form, wherein the triangles have the same shape and the same cross sectional area; and the apices of the triangles from left to right or from right to left of the light-reflecting plate have the successively increasing or decreasing distances away from the smooth surface of the light-reflecting plate; the connection lines of the apices is a straight line, intersecting with the line where the section of the smooth surface of the light-reflecting plate is located and forming an inclusion angle α, which is less than 45° and the distance of all triangles is equal in the length direction; and a light-reflecting plate;

a heat-dissipating strip; and a plurality of lamp bodies, wherein a flange is positioned at the edge of the micro prism body whose apex of the triangle is farthest to the smooth surface among the micro prism bodies of the light-reflecting plate is equipped with a long groove at the side of the prism surface and parallel to the prism body; and the heat dissipating strip is made of heat-conducting metal materials, the section of the heat dissipating strip can be rectangular or angular shape and it is installed at the upper part of the long groove; the surface of the side exposing outside the long groove is the heat-dissipating side equipped with parallel heat-dissipating ribs and a lamp groove is formed between its lower surface and the corresponding wall of the long groove; and the lamp body comprises LED, light bulb, electrode tube or prefabricated LED lamp assembly, which are installed in the lamp grooves, respectively.

16. The sheet lamp of claim 15, wherein the lamp body is prefabricated long-strip lamp assembly comprising a plurality of LED bonding dies and circuit board and the bonding die can be installed directly or by injection in the lamp groove so that the emitting plane of the LED inside the groove intersects with the surface where the connection lines of the apices of the sectional triangles on the prism surface of the light-reflecting plate are located, and forms an inclusion angle of 90-α.

17. The sheet lamp of claim 15, wherein the side of the sectional triangle where the triangular prism body radiates towards the LED is the light-receiving marginal side and also the light-receiving marginal face of the triangular prism body, wherein the extension line of the marginal side intersects with the smooth surface relative to the prism surface and forms an inclusion angle with the normal line equal to or greater than 45°.

18. A plate lighting fixture made of the sheet lamp of claim 15, wherein it further comprises a sheet lamp, retaining pieces and a bottom frame, wherein the bottom frame comprises the retaining frame of sheet lamp and bottom plate; the retaining frame of the sheet lamp is equipped with enclosure wall available for clamping the sheet lamp on the front surface and a plurality of installation holes on the rear surface; the retaining pieces are a plurality of magnetic pieces and are installed in the installation holes respectively; the bottom frame is a flat plate that can be installed on any outdoor and indoor plate walls via the connecting pieces and is equipped with metal blocks to be engaged with the magnetic pieces at the places corresponding to the magnetic pieces.

* * * * *